United States Patent [19]
Bennett et al.

[11] Patent Number: 5,939,028
[45] Date of Patent: *Aug. 17, 1999

[54] COMBATTING AIR POLLUTION

[75] Inventors: Stephen C Bennett, Reading; Jonathan C Frost, Henley on Thames; David S Lafyatis; Andrew P Walker, both of Reading, all of United Kingdom

[73] Assignee: Johnson Matthey PLC, London, United Kingdom

[ * ] Notice: This patent is subject to a terminal disclaimer.

[21] Appl. No.: 08/795,388

[22] Filed: Feb. 4, 1997

Related U.S. Application Data

[63] Continuation of application No. PCT/GB96/01320, Jun. 5, 1996, abandoned.

[30] Foreign Application Priority Data

Jun. 6, 1995 [GB] United Kingdom .................... 9511421
Dec. 13, 1995 [GB] United Kingdom .................... 9525413

[51] Int. Cl.[6] .......................... B01D 50/00; B01D 53/34
[52] U.S. Cl. ........................ 422/177; 422/108; 422/169; 422/170; 422/171; 60/285; 60/297; 60/299; 60/311
[58] Field of Search .................... 423/213.2; 422/177, 422/169, 171, 170, 211, 180, 222, 108–109; 60/299, 274, 297, 289, 285, 311

[56] References Cited

U.S. PATENT DOCUMENTS

| 5,296,198 | 3/1994 | Abe et al. .............................. 422/180 |
| 5,397,550 | 3/1995 | Marino, Jr. ............................. 422/178 |
| 5,417,947 | 5/1995 | Hertl et al. ............................. 60/311 |
| 5,447,694 | 9/1995 | Swaroop et al. ....................... 422/171 |
| 5,776,417 | 7/1998 | Frost et al. ............................. 422/171 |

FOREIGN PATENT DOCUMENTS

| 602865 | 6/1994 | European Pat. Off. . |
| 602963 | 6/1994 | European Pat. Off. . |
| 4117364 | 3/1992 | Germany . |
| 53-89482 | 8/1978 | Japan . |
| 54-71225 | 6/1979 | Japan . |
| 60-93110 | 5/1985 | Japan . |
| 559937 | 3/1993 | Japan . |
| 285387 | 11/1993 | Japan . |
| 6319948 | 11/1994 | Japan . |

*Primary Examiner*—Hien Tran
*Attorney, Agent, or Firm*—Pillsbury Madison & Sutro LLP; Cushman Darby & Cushman Intellectual Property Group

[57] ABSTRACT

The hydrocarbon light-off time in engine exhaust is reduced by employing a hydrogen oxidation catalyst, a CO oxidation catalyst of light-off temperature for CO and/or hydrogen below ambient temperature, and sufficient oxygen and sufficient CO and/or hydrogen in the exhaust that the exothermic reaction of the oxygen with the CO and/or hydrogen over the CO oxidation catalyst generates enough heat to raise the temperature of the CO oxidation catalyst to at least the light-off temperature of the hydrocarbon oxidation catalyst.

22 Claims, 24 Drawing Sheets

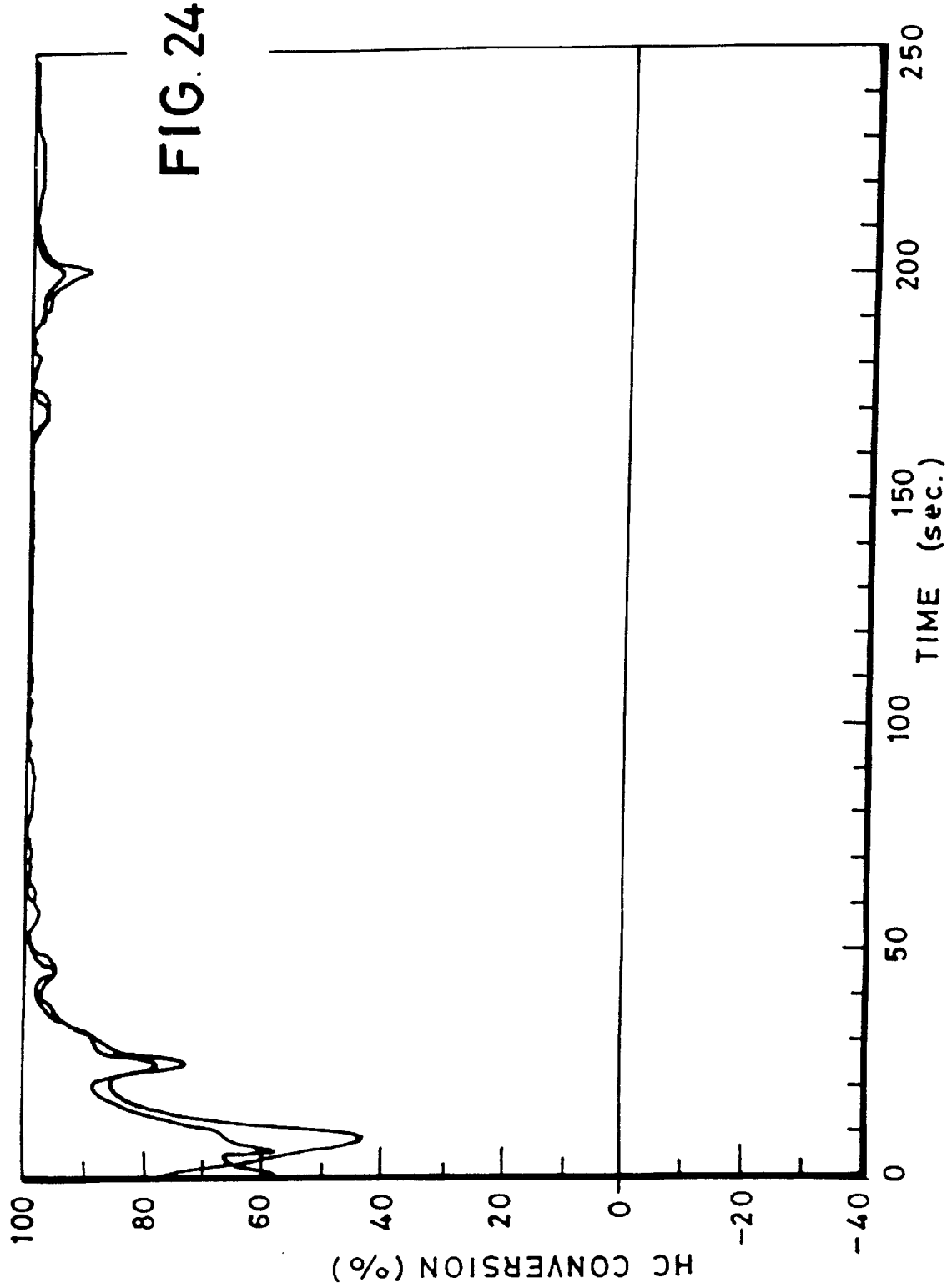

COMBATTING AIR POLLUTION

This is a Continuation of International Appln. No. PCT/GB96/01320 filed Jun. 5, 1996, now abandoned, which designated the U.S.

This invention concerns an engine having exhaust apparatus connected thereto and a method of converting CO and hydrocarbon in the exhaust gas of an engine to $CO_2$ and water in order to combat air pollution. The engine may be a stationary engine but is especially a vehicle engine. The engine may be powered by petrol (gasoline), diesel, natural gas or other hydrocarbon or oxygenate fuel. The invention will be described with particular reference to petrol fuelled engines, but is not to be considered to be limited thereto.

The main pollutants in the exhaust gas of a petrol engine are carbon monoxide (CO), hydrocarbons and nitrogen oxides. The amount of these pollutants which is emitted in the exhaust gas into the air is generally reduced by means of catalysts in the exhaust apparatus of the engine. CO is converted to $CO_2$ by a CO oxidation catalyst. Hydrocarbon is converted to $CO_2$ and water by a hydrocarbon oxidation catalyst. Nitrogen oxides are converted to nitrogen by a nitrogen oxides reduction catalyst. A so-called three-way catalyst converts CO, hydrocarbon and nitrogen oxides in this way. Three-way catalysts are composed of a mixture of catalytically active materials, one being active for the conversion of CO and hydrocarbons and one for the conversion of nitrogen oxides. Three-way catalysts are generally based on rhodium admixed with platinum and/or palladium.

As regulations governing the amount of pollutants which may be emitted from petrol engines have become stricter, attention has been focussed on the start-up phase from ambient temperature. For present purposes, ambient temperature may be defined as 25° C. Emissions of hydrocarbons are highest in this phase because the hydrocarbon oxidation catalyst has not warmed up to its operating temperature. The "light-off" temperature is the temperature at which 50% of the pollutant is converted. On starting an engine at ambient temperature, the time taken for the hydrocarbon oxidation catalyst to warm up to its light-off temperature is significant, and in that time a significant amount of hydrocarbon is emitted into the air. The present invention is designed to reduce that time and hence reduce the amount of hydrocarbon emitted.

The invention provides an engine having exhaust apparatus connected thereto, which exhaust apparatus contains a CO oxidation catalyst to convert CO in the exhaust gas leaving the engine to $CO_2$ by reaction with oxygen, and a hydrocarbon oxidation catalyst to convert hydrocarbon in the exhaust gas leaving the engine to $CO_2$ and water by reaction with oxygen, by contacting the exhaust gas containing the CO and hydrocarbon with the CO oxidation catalyst and simultaneously or subsequently with the hydrocarbon oxidation catalyst, wherein the CO oxidation catalyst is of light-off temperature for CO and/or hydrogen below ambient temperature under operating conditions and the engine and exhaust apparatus are adapted so that on starting the engine at ambient temperature the exhaust gas contacting the CO oxidation catalyst contains sufficient oxygen and sufficient CO and/or hydrogen that the exothermic reaction of the oxygen with the CO and/or hydrogen generates enough heat to raise the temperature of the CO oxidation catalyst from ambient temperature to at least the light-off temperature of the hydrocarbon oxidation catalyst so that the hydrocarbon oxidation catalyst is at a temperature of at least the light-off temperature of the hydrocarbon oxidation catalyst.

The invention provides also a method of converting CO and hydrocarbon in the exhaust gas of an engine to $CO_2$ and water in order to combat air pollution, by contacting the exhaust gas with a CO oxidation catalyst and simultaneously or subsequently with a hydrocarbon oxidation catalyst, wherein the CO oxidation catalyst is of light-off temperature for CO and/or hydrogen below ambient temperature under operating conditions and the method is conducted so that on starting the engine at ambient temperature the exhaust gas contacting the CO oxidation catalyst contains sufficient oxygen and sufficient CO and/or hydrogen that the exothermic reaction of the oxygen with the CO and/or hydrogen generates enough heat to raise the temperature of the CO oxidation catalyst from ambient temperature to at least the light-off temperature of the hydrocarbon oxidation catalyst so that hydrocarbon oxidation catalyst is at a temperature of at least the light-off temperature of the hydrocarbon oxidation catalyst.

In the present invention, the exothermic reaction of the oxygen with the CO and/or hydrogen generates enough heat to raise the temperature of the CO oxidation catalyst from ambient temperature to at least the light-off temperature of the hydrocarbon oxidation catalyst. This contrasts with the past in which engine heat conveyed by the exhaust gas, sometimes supplemented by electrical heating of the catalyst or gas, has been necessary to raise the temperature to the light-off temperature of the hydrocarbon oxidation catalyst. Thus, in a typical system, engine heat would raise the temperature of a CO oxidation catalyst to its light-off temperature (ie to the light-off temperature for CO), and the exothermic reaction ensuing would then raise the temperature further until a combination of the exothermic reaction and the engine heat would raise the temperature (often by a further 100° C. or so) to the light-off temperature of the hydrocarbon oxidation catalyst As engines have developed, their manufacturers have adapted them so that the exhaust gas leaving the engine contains less CO. Less CO is thus emitted into the air or less CO has to be converted by the CO oxidation catalyst To facilitate cranking an engine, the air-fuel ratio employed on starting the engine is generally rich, ie there is an excess of fuel over the stoichiometric ratio (14.65:1) required for fuel combustion. Thus, there has been on starting the engine insufficient oxygen or insufficient CO to raise the temperature to the light-off temperature of the hydrocarbon oxidation catalyst; it has necessitated extra heat, usually comprising engine heat, to do this. The amount of hydrogen in the exhaust gas leaving engines in the past has been extremely small. We have found that similar considerations apply as for CO; the exothermic reaction of oxygen and hydrogen to produce water by a CO oxidation catalyst whose light-off temperature for hydrogen is below ambient temperature under operating conditions can quickly raise the temperature to the light-off temperature of the hydrocarbon oxidation catalyst if sufficient oxygen and hydrogen is made to be present.

In the present invention, on starting the engine at ambient temperature, the CO oxidation catalyst, because its light-off temperature is below ambient temperature, can immediately begin its exothermic reaction. Because there is sufficient oxygen and sufficient CO and/or hydrogen, the exothermic reaction itself provides enough heat to heat up the exhaust gas from ambient temperature to at least the light-off temperature of the hydrocarbon oxidation catalyst. Engine heat is a bonus. Accordingly, the hydrocarbon oxidation catalyst reaches its light-off temperature remarkably quickly.

One can check whether the present exothermic reaction generates enough heat to raise the temperature of the CO oxidation catalyst from ambient temperature to at least the light-off temperature of the hydrocarbon oxidation catalyst, or whether heat from elsewhere is also necessary to do this, by bringing gas of the composition of the exhaust gas but at ambient temperature into contact with the CO oxidation catalyst and seeing if its temperature is raised to the light-off temperature of the hydrocarbon oxidation catalyst Alternatively, one can test by moving the CO oxidation catalyst and the hydrocarbon oxidation catalyst further away from the engine; even though engine heat has thereby been partially lost by the exhaust gas, the present system will still work. Indeed, the present system would still work if all the engine heat initially carried by the exhaust gas had been lost by the exhaust gas.

Besides reduced light-off time and hence reduced hydrocarbon emissions, the present invention affords other advantages. Because engine heat is not necessary in order for the hydrocarbon oxidation catalyst to reach its light-off temperature, it need not be close to the engine; because the CO oxidation catalyst lights off below ambient temperature, it need not be close to the engine. Accordingly, either or both catalysts can be positioned further from the engine. This means that the catalyst can suffer less from thermal degradation and need not be accommodated in restricted space close to the engine but can be accommodated under a vehicle floor. A further advantage which flows from the ability to site the CO oxidation catalyst or the hydrocarbon oxidation catalyst further from the engine is that in such a position the catalyst is less affected by the heat carried in the exhaust gas from the engine and hence a temperature measuring device, usually a thermocouple, in the catalyst more closely indicates the extent to which the oxidation of the CO or hydrocarbon is occurring because the device is less influenced by this engine heal Such a device can be used as an on-board diagnostic means, so that the performance of the catalyst can be measured and monitored. Accordingly, in a particular embodiment, a temperature measuring device measures the temperature of the CO oxidation catalyst or the hydrocarbon oxidation catalyst, and this device is linked to and controls a display which indicates the performance of the catalyst in its reaction as determined by the temperature measured by the temperature measuring device. The present invention enables light-off of hydrocarbon to be achieved remarkably quickly, and this means that by-pass systems and their associated valves used in the past in arrangements to speed light-off can be avoided. In a preferred embodiment, the present exhaust apparatus contains no by-pass system; in a preferred embodiment, the apparatus contains no valves. A further advantage is that since the hydrocarbon oxidation catalyst reaches its operating temperature more quickly, heat from the exhaust gas after the catalyst can be used to heat the interior of a vehicle, for instance by means of a heat exchanger, so that the interior warms up more rapidly than when relying solely on conventional means, using heat from the radiator. Accordingly, in a preferred embodiment the exhaust apparatus contains also means to use the heat from the exhaust gas after it contacts the hydrocarbon oxidation catalyst in order to heat the interior of a vehicle.

In the present invention, there is more oxygen or more CO and/or hydrogen on starting the engine than was disclosed or suggested in the past with a CO oxidation catalyst whose light-off temperature for CO and/or hydrogen is below ambient temperature under operating conditions. Besides any oxygen in the exhaust gas leaving the engine, the present invention preferably employs a secondary source of oxygen. The oxygen is conveniently air. The secondary source can be an air pump. To provide more hydrogen than any in the exhaust gas leaving the engine, a secondary source of hydrogen can be employed. This can be for example a reformer to convert fuel such as hydrocarbon, eg methane, or alcohol, eg methanol or ethanol, to hydrogen, for example by partial combustion. The source can be for instance a so-called "hot-spot" reactor; in such a reactor a fuel such as hydrocarbon or methanol is injected with oxygen into a mass of catalyst so that a front of reacting gas forms around the injection point to form hydrogen by partial combustion. To provide more CO than any in the exhaust gas leaving the engine, and optionally provide more hydrogen too, a partial combustion burner can be employed. More CO and/or hydrogen than any which is normally present in the exhaust gas leaving the engine can be provided by adapting the electronic management system of the engine. This can be done for instance by suitable arrangement of the memory and/or control circuitry on the engine management "chip". The composition of the exhaust gas can be changed by the engine management system if desired after light-off of the hydrocarbon oxidation catalyst, for instance to reduce the amount of CO in the exhaust gas leaving the engine. This can be done by setting a time interval. Alternatively, a feed-back mechanism from a temperature measuring device measuring the exhaust gas temperature, for instance at the hydrocarbon oxidation catalyst, can be employed. It is an advantage of the present invention, however, that any temperature feed-back mechanism is unnecessary.

Preferably, the CO aspect rather than the hydrogen aspect is employed. Accordingly, preferably the CO oxidation catalyst is of light-off temperature for CO below ambient temperature under operating conditions and the engine and exhaust apparatus are adapted so that on starting the engine at ambient temperature the exhaust gas contacting the CO oxidation catalyst contains sufficient oxygen and sufficient CO that the exothermic reaction of the oxygen with the CO generates enough heat to raise the temperature of the CO oxidation catalyst from ambient temperature to at least the light-off temperature of the hydrocarbon oxidation catalyst so that the hydrocarbon oxidation catalyst is at a temperature of at least the light-off temperature of the hydrocarbon oxidation catalyst.

The amount of CO needed in the exhaust gas contacting the CO oxidation catalyst depends on the rise in temperature needed by the exothermic reaction to reach the light-off temperature of the hydrocarbon oxidation catalyst. In general, the higher that temperature, the higher the amount of CO needed. In general, the exhaust gas contacting the CO oxidation catalyst on starting the engine at ambient temperature contains by volume more than 0.5%, preferably more than 2%, especially more than 4%, CO; usually it contains less than 10% CO by volume. Providing more CO in the exhaust gas contacting the CO oxidation catalyst is contrary to the direction in which engine manufacturers have been developing engines as mentioned above.

Usually, the exhaust gas contacting the CO oxidation catalyst contains sufficient oxygen that substantially all the CO and/or hydrogen in the gas is reacted by the CO oxidation catalyst. Otherwise CO and/or hydrogen is emitted into the air or alternative means have to be employed to deal with any excess, for instance a further, down-stream, catalyst.

In one strategy on starting the engine at ambient temperature, the air-fuel ratio of the mixture combusted in the engine is lean or near stoichiometric, for instance above 14.5. In an alternative such strategy, the air-fuel ratio is rich, ie below 14.65, and a secondary source of oxygen is employed to provide oxygen to the exhaust gas contacting the CO oxidation catalyst on starting the engine at ambient temperature.

The CO oxidation catalyst is advantageously also the hydrocarbon oxidation catalyst, in which case the exhaust gas contacts them simultaneously. This can be done by employing a material which is catalytically active for the oxidation of both CO and hydrocarbon. Alternatively, it can be done by employing a mixture of a material which is catalytically active for the oxidation of CO with a different material, which is catalytically active for the oxidation of hydrocarbon. The hydrocarbon oxidation catalyst can be contacted subsequent to contact with the CO oxidation catalyst; this can be achieved by having the hydrocarbon oxidation catalyst down-stream of the CO oxidation catalyst, eg by having the CO oxidation catalyst on the front part of a honeycomb monolith and the hydrocarbon oxidation catalyst on the rear part of the monolith.

The exothermic reaction of the oxygen with the CO and/or hydrogen heats the CO oxidation catalyst to at least the light-off temperature of the hydrocarbon oxidation catalyst. When the CO oxidation catalyst is the hydrocarbon oxidation catalyst, the latter is then automatically at a temperature of at least the light-off temperature of the hydrocarbon oxidation catalyst. When the CO oxidation catalyst is not the hydrocarbon oxidation catalyst, so that the exhaust gas contacts the hydrocarbon oxidation catalyst after contacting the CO oxidation catalyst, then heat from the CO oxidation catalyst is used to heat the hydrocarbon oxidation catalyst, usually by the exhaust gas carrying heat from the CO oxidation catalyst to the hydrocarbon oxidation catalyst.

The CO oxidation catalyst is of light-off temperature for CO and/or hydrogen below ambient temperature under operating conditions, in an engine exhaust apparatus. This is a demanding environment because of such features as high temperatures, physical shocks, high gas flow, and inhibitors in the exhaust gas. Some CO oxidation catalysts may be of light-off temperature for CO and/or hydrogen below ambient temperature when in a more tolerant environment but not in the present situation. In the present invention, the exhaust gas contacting the CO oxidation catalyst may contain for instance 1–20% by volume water. It may contain for instance 1–20% by volume $CO_2$. It may contain for instance 100–2000 ppm NO. It may contain for instance 100–10000 ppm hydrocarbon. It may contain for instance 0.2–20 ppm $SO_2$. In this specification, ppm means parts per million by volume.

Preferably the CO oxidation catalyst is of positive order kinetics with respect to CO in its oxidation reaction. This contrasts with typical catalysts for exhaust systems, which are of negative or zero order. For a catalyst with negative order kinetics with respect to CO, increasing the CO concentration would decrease the rate of CO oxidation at temperatures below the light-off temperature. For a catalyst with zero order kinetics with respect to CO, increasing the CO concentration would leave unchanged the rate of CO oxidation at temperatures below the light-off temperature. The consequence of negative or zero order kinetics is that additional CO would not cause a larger exotherm over the CO oxidation catalyst until after the catalyst has lit off, so that at temperatures below light-off temperature, higher CO levels would not cause an increase in the reaction rate or heat generated. However, for a catalyst with positive order kinetics with respect to CO, an increase in CO concentration would lead to an increase in reaction rate, and thus in heat generation. Hence such a catalyst is advantageous in the present invention where there is sufficient CO and/or hydrogen, for instance by increasing their amounts by engine management, that the exotherm generates enough heat to raise the temperature from ambient temperature to the light-off temperature of the hydrocarbon oxidation catalyst.

Materials suitable for use as the present CO oxidation catalyst or hydrocarbon oxidation catalyst can be selected from known catalysts, though a CO oxidation catalyst which lights off below ambient temperature under operating conditions has not been employed commercially in the past to treat engine exhaust gas as far as we know. Whether any given CO oxidation catalyst satisfies the present light-off characteristic can be ascertained by testing. In a preferred embodiment, the CO oxidation catalyst comprises a catalyst (called herein the high interaction catalyst) which is of light-off temperature for CO and/or hydrogen below ambient temperature under operating conditions and which is composed of metal oxide particles among which are uniformly incorporated noble metal particles, the catalyst having such a high interaction between the noble metal particles and the metal oxide particles that, without hydrogen reduction pre-treatment, it exhibits the formation of anionic vacancies on the metal oxide surface at a temperature lower than does the corresponding catalyst, without hydrogen reduction pre-treatment, containing the same amount of the metal oxide particles and noble metal particles and prepared by impregnating the metal oxide particles with noble metal precursor and calcining to convert the precursor to the noble metal particles. The high interaction catalyst has an extremely high degree of interaction between the noble metal particles and the metal oxide particles. This degree of interaction can be achieved by co-precipitation of the noble metal particles and the metal oxide particles. Catalysts of this degree of interaction are described for instance in European patent specification 602865A, the contents of which are incorporated herein by reference. The metal oxide preferably comprises one or more of $CeO_2$, $ZrO_2$, $TiO_2$ and $SnO_2$, especially $CeO_2$. The high interaction catalyst usually contains 0.1 to 30% by weight of the noble metal particles based on the total weight of the noble metal particles and the metal oxide particles. Alternatively, other catalysts which have a high degree of interaction between noble metal and an intermixed metal oxide can be employed.

The CO oxidation catalyst preferably comprises (ie consists of or includes) one or both of platinum and palladium, and hence the noble metal in the high interaction catalyst preferably comprises one or both of platinum and palladium. It will be appreciated, however, that the platinum and/or palladium are not in an environment as was commonly employed to treat engine exhaust gas but in an environment in which their CO light-off temperature under operating conditions is below ambient temperature.

So as to be able to treat also nitrogen oxides in the engine exhaust gas, the exhaust apparatus usually contains also a catalyst to reduce nitrogen oxides in the exhaust gas to nitrogen. The catalytically active material for this usually comprises rhodium. Conveniently, a three-way catalyst is employed, which treats the CO, hydrocarbon and nitrogen oxides. Advantageously, the present CO oxidation catalyst is a three-way catalyst.

In a preferred embodiment, the exhaust apparatus contains at least one (usually one or two) additional catalyst, which is a three-way catalyst to convert CO in the exhaust gas to $CO_2$ by reaction with oxygen, hydrocarbon in the exhaust gas to $CO_2$ and water by reaction with oxygen, and nitrogen oxides in the exhaust gas to nitrogen. In this way, the present CO oxidation catalyst and hydrocarbon oxidation catalyst can be used on switching on the engine, and the additional catalyst or catalysts can be used as the main catalyst.

Any of the catalysts discussed above in relation to the present invention can be formulated in the usual way.

Usually the catalyst comprises catalytically active material on a support which is generally a refractory metal oxide, for instance alumina. In the case of the high interaction catalyst, the noble metal is already in admixture with metal oxide, so a separate support may not be needed. The support should preferably be of high surface area, eg greater than 20 m$^2$/g. The catalytically active material, optionally on a support, is preferably carried on a carrier, for instance by being carried on a gauze but preferably by being carried in the channels of a honeycomb monolith through which the exhaust gas flows. The monolith can be metal or ceramic. Advantageously, any of the catalysts, and their carriers are of low thermal mass.

The present method, and engine and exhaust apparatus, are usually such that the ratio of the volume of the CO oxidation catalyst and any carrier thereof (for instance a honeycomb monolith) to the engine displacement is less than 3, preferably less than 1, especially less than 0.1. This is a measure of the physical size of the catalyst and carrier needed, eg in a can or in a box in the exhaust apparatus.

The exhaust apparatus preferably contains also a hydrocarbon trap which traps hydrocarbon in the exhaust gas at lower temperatures and releases it at higher temperatures to contact the hydrocarbon oxidation catalyst, preferably to contact also the CO oxidation catalyst. In this way, hydrocarbon can be stored while the exothermic reaction on the CO oxidation catalyst heats up the hydrocarbon oxidation catalyst, and then hydrocarbon released when the hydrocarbon oxidation catalyst can better treat the hydrocarbon. The hydrocarbon trap is preferably up-stream of the hydrocarbon oxidation catalyst, and preferably upstream of the CO oxidation catalyst. Alternatively, hydrocarbon trap and catalyst can be admixed or the trap can be a layer above or below a layer of catalyst. Hydrocarbon trap materials are known in themselves. Usually, the hydrocarbon trap comprises a zeolite. A suitable zeolite is an ion-exchanged zeolite, such as Co/ZSM-5 or Pt/ZSM-5, but other materials, including impregnated zeolites and non-metallised zeolites, may be used. Preferred hydrocarbon trap materials are those which have a trapping effect also on nitrogen oxides (particularly NO), so that they too are trapped at lower temperatures and released at higher temperatures. The hydrocarbon trap can comprise the material known as silicalite as a cost-effective hydrocarbon trap material.

It is desirable that when the engine is started at ambient temperature, the CO oxidation catalyst is not exposed to sufficient concentrations of hydrocarbons and/or nitrogen oxides (particularly NO) that the CO oxidation is inhibited and hence light-off delayed. The hydrocarbon trap discussed above and the CO oxidation catalyst can thus be arranged to achieve this. In some instances in the past, it has been proposed to add fuel to the exhaust gas up-stream of an initial catalyst with a view to improving the purification of exhaust gas during cold engine start-up periods. In the present invention, it is much preferred that fuel be not added to the exhaust gas.

We have found that it can be advantageous to sweep gas, usually air, preferably heated air, over the CO oxidation catalyst before starting the engine, to reduce the amount of gas which has been adsorbed on the catalyst. Such adsorbed gas may be H$_2$O (water vapour), CO$_2$, NO or hydrocarbon. Hence, in a preferred embodiment, the exhaust apparatus contains also means to thus sweep gas over the catalyst. After such pre-treatment, the catalyst can have enhanced catalytic activity for CO conversion on starting the engine at ambient temperature. The catalyst is preferably in the state that results from this sweep, whether it has been achieved in this way or otherwise.

The exhaust apparatus preferably contains means to dry, or keep dry, the CO oxidation catalyst before the exhaust gas contacts it, preferably before starting the engine. The hydrocarbon oxidation catalyst and, if employed, the hydrocarbon trap are preferably likewise pre-dried or kept dry. The means to keep the CO oxidation catalyst dry can be for instance a device to prevent the back-diffusion of air from the outside into the exhaust pipe; the device can be a shut-off valve or a desiccant water trap. The pre-drying can be done by the sweep of gas discussed above.

The means to sweep gas or to pre-dry can comprise for instance a pump to provide a stream of gas, usually air, over the catalyst, preferably after switching off the engine. The air is preferably heated air, eg air at 350–500° C. Advantageously, residual engine heat, for instance that transferred to the exhaust apparatus, is used so that the air employed is heated.

The exhaust apparatus preferably contains also a water trap to trap water on starting the engine at ambient temperature before the water can contact the CO oxidation catalyst. The presence of water can adversely affect the operation of the CO oxidation catalyst and particularly the hydrocarbon trap. The water trap is preferably up-stream of the CO oxidation catalyst, and preferably up-stream of the hydrocarbon trap if such is employed. Alternatively, the water trap can be admixed with the CO oxidation catalyst and/or the hydrocarbon trap, or a layered arrangement can be employed. The water trap preferably comprises a water trapping molecular sieve, such as zeolite 5A, although zeolite 3A, 4A or 13X may be used. Most zeolites preferentially adsorb water in comparison with their adsorption of hydrocarbon, but in general the smaller pore size zeolites are preferred. The water trap and the hydrocarbon trap may also comprise the same material.

In a preferred embodiment, the water trap is dried by the means to dry discussed above. In this embodiment, the means to dry can incorporate a secondary water trap to dry gas, usually air, from a gas pump for the purpose of drying the main water trap. The secondary water trap can be dried or regenerated during engine operation by utilising waste heat, for instance from the engine, eg with a relatively low flow of gas from the pump.

In the past, a CO oxidation catalyst has been positioned, in the so-called close-coupled position close to the engine, generally 20–30 cm from the outlet of an engine manifold, as measured by gas flow length. This is because engine heat has been necessary to light off the catalyst. In the present invention, such engine heat is not necessary. Accordingly, due to its sub-ambient temperature oxidation activity, the present CO oxidation catalyst can be positioned anywhere in the exhaust system rather than having to be in a close-coupled position. This is a great advantage. It means that the catalyst need not be in the very restricted space for the engine in a vehicle; instead, the catalyst can be under the vehicle floor. The catalyst is preferably at least 50 cm, for instance at least 1 meter, but usually less than 10 meters, generally less than 4 meters, as measured by gas flow length, from the exit of the exhaust gas from the engine, for instance from the outlet of an engine manifold. Because it can be remote from the heat generated by the engine, the catalyst need not be so thermally durable. Preferably, the maximum temperature to which the present catalyst is subjected in the invention is less than 950° C., preferably less than 850° C., especially less than 700° C., particularly less than 500° C. By-pass apparatus can be present around the present apparatus so that it does not encounter exhaust gas throughout engine operation after light-off of the hydrocarbon oxidation catalyst, but any valves operating such apparatus can be subject to lower temperatures by being more remote from the engine. When secondary air injection up-stream of the CO oxidation catalyst is employed, as is preferred, this similarly need not be in the engine space but can be more remote. A further benefit of the CO oxidation catalyst being remote is that possible problems of it interfering with the performance of a separate main, three-way, catalyst can be avoided. Indeed, in a particularly interesting embodiment of the present invention the present CO oxidation catalyst is down-stream of a three-way catalyst.

Similarly, other devices whose position depends on the CO oxidation catalyst, such as the hydrocarbon oxidation catalyst, a hydrocarbon trap, a water trap, means to sweep gas or means to dry the CO oxidation catalyst as discussed above, can all be remote from the engine and hence subject to lower temperatures. The lower temperatures can enable the water trap to trap water longer and the hydrocarbon trap to trap hydrocarbon longer.

The CO oxidation catalyst does not depend essentially on heat in the exhaust gas leaving the engine on starting the engine at ambient temperature in order to reach the light-off temperature of the hydrocarbon oxidation catalyst. Consequently, this initial heat can be used for other purposes, for instance to heat the interior of a vehicle, usually by means of a heat exchanger to transfer heat from the exhaust gas to air passing into the interior. Accordingly, in a preferred embodiment, the exhaust apparatus contains also means to use the heat from the exhaust gas before it contacts the CO oxidation catalyst in order to heat the interior of a vehicle. In this way, the interior of a vehicle can be more rapidly warmed up than when relying solely on conventional means, using heat from the radiator. Alternatively, or in addition, the initial heat can be used to heat up engine oil more quickly, leading to more efficient operation of the engine. Taking heat from the exhaust gas before it contacts the CO oxidation catalyst can also be advantageous in thus reducing the maximum temperature to which the catalyst is exposed. However, the initial heat in the exhaust gas can be used to help raise the temperature of the CO oxidation catalyst or the hydrocarbon oxidation catalyst to the light-off temperature of the hydrocarbon oxidation catalyst, so using this initial heat for other purposes must be balanced by the need to achieve hydrocarbon light-off in the time desired.

The light-off temperature for CO and/or hydrogen of the present CO oxidation catalyst is below ambient temperature. This is much below the light-off temperature of current commercial CO oxidation catalysts in engine exhaust apparatus, which is usually about 150° C. or more. A system analogous to that of the present invention but employing a CO oxidation catalyst whose said light-off temperature is below that of the current commercial catalysts but above that of the present catalyst would have some of the advantages of the present invention but not all, since some heat, such as engine heat, would be necessary to raise the temperature of the catalyst to its light-off temperature.

The present invention may be applied to engines in general whose exhaust gas contains CO and hydrocarbon. It is applicable to lean burn engines, for instance diesel engines. Preferably the engine is a petrol (gasoline) engine. The engine is preferably that of a vehicle.

The present method, and engine and exhaust apparatus, are remarkably effective in converting hydrocarbon in the cold start-up period. Usually they lower the total amount of hydrocarbon emitted from the exhaust apparatus in the first 50 seconds after starting the engine at ambient temperature by a factor of at least 2, preferably by a factor of at least 5, compared to the amount emitted by the engine without the present exhaust apparatus. Usually the total amount of hydrocarbon emitted in the first 100 seconds after starting the engine at ambient temperature is less than 0.4 g, preferably less than 0.1 g, especially less than 0.04 g.

The invention is illustrated by the following drawings, in which:

FIG. 24 is a corresponding graph of % hydrocarbon (HC) conversion against time.

Figure 1:
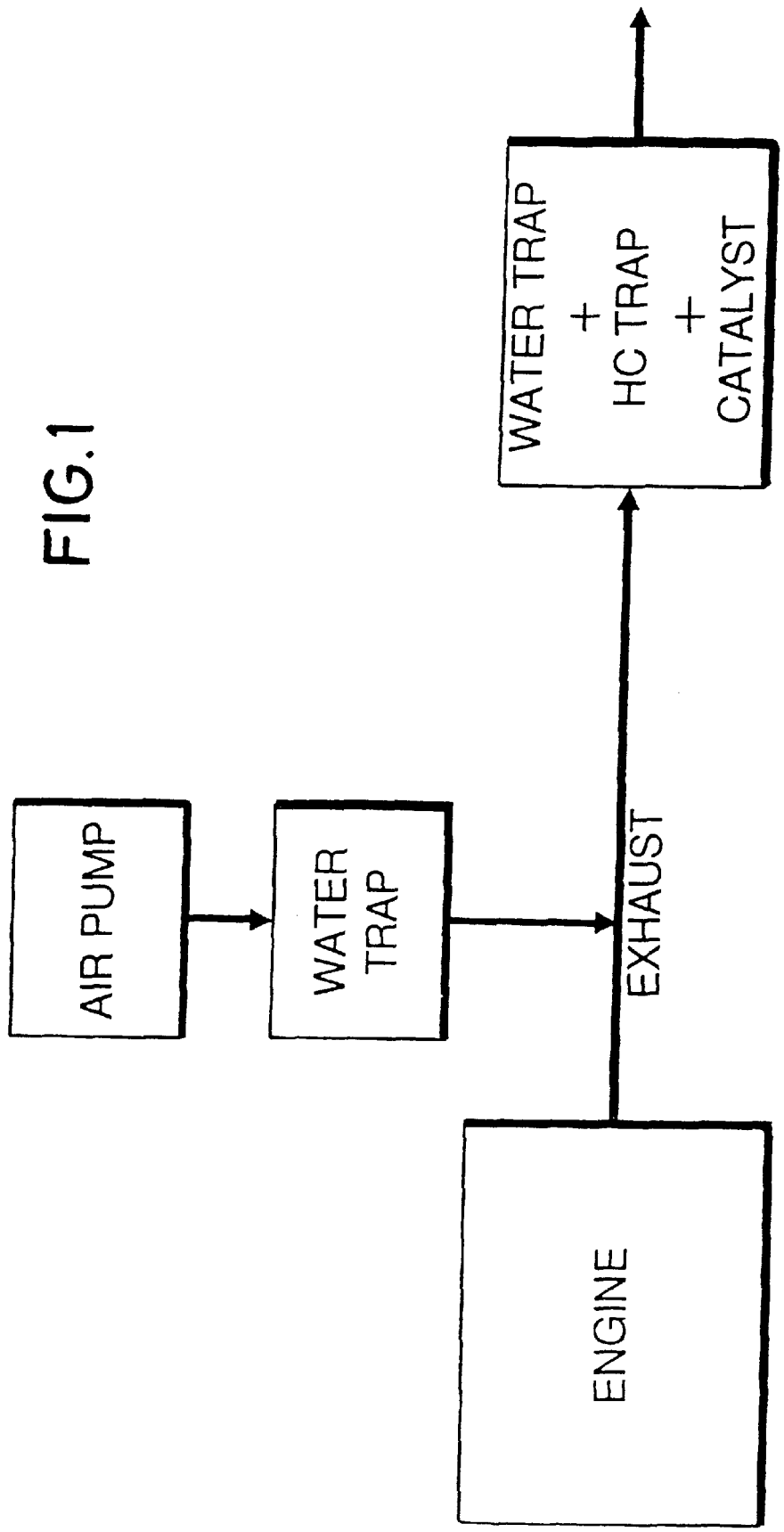
FIG. 1 is a schematic diagram of a preferred engine and exhaust apparatus according to the invention.

FIGS. 2–24 are described more fully in the Examples which follow. Referring to FIG. 1, exhaust gas from an engine is passed to exhaust apparatus containing a water trap (eg a molecular sieve), a hydrocarbon trap (labelled HC trap in the diagram) and a combined CO oxidation catalyst/ hydrocarbon oxidation catalyst of light-off temperature for CO below 25° C. The water trap, hydrocarbon trap and catalyst are dried before each engine start-up, by an air pump which takes ambient air and passes it through a second molecular sieve water trap (eg zeolite 5A) which is heated by residual engine heat and which continues to operate after switching off the engine. The secondary molecular sieve is itself dried during normal engine operation by the combination of residual engine heat and a flow of air from the air pump, and after switching off the engine, the secondary molecular sieve and pump provide hot dried air to dry the water trap, hydrocarbon trap and catalyst. In this arrangement, at least one additional catalyst, which can be for instance a three-way catalyst can be incorporated into the exhaust apparatus up-stream or down-stream of the combined CO oxidation catalyst/hydrocarbon oxidation catalyst.

The invention is illustrated by the following Examples.

EXAMPLE 1 AND COMPARATIVE EXAMPLE 1

Two car exhaust catalysts are each coated onto a conventional, cordierite, honeycomb monolith (a "brick") having 400 cells per square inch (6.45 square cm). The volume of catalyst and monolith was 0.7 liter. The catalysts were tested in a synthetic, lean, gas mixture of composition:

| | |
|---|---|
| NO | 500 ppm |
| $C_3H_6$ | 400 ppm |
| $C_7H_8$ (toluene) | 100 ppm |
| $CO_2$ | 15% |
| $H_2O$ | 10% |
| $O_2$ | 3% |
| CO | 4% (reduced to 0.5% at time = 200 second into the run) |
| Ar | balance |

One of the catalysts, termed here the present catalyst consists of Pd, Pt and $CeO_2$ and contains 4% by weight Pd and 2% by weight Pt, and was prepared by co-precipitation as described in European specification 602865A. The other catalyst, used for comparison, is a commercially available low light-off catalyst called JM154 from Johnson Matthey PLC, and consists of Pd and Pt on an $Al_2O_3$—$CeO_2$—$ZrO_2$ support and contains 8% by weight Pd and 2% by weight Pt.

Figure 2:
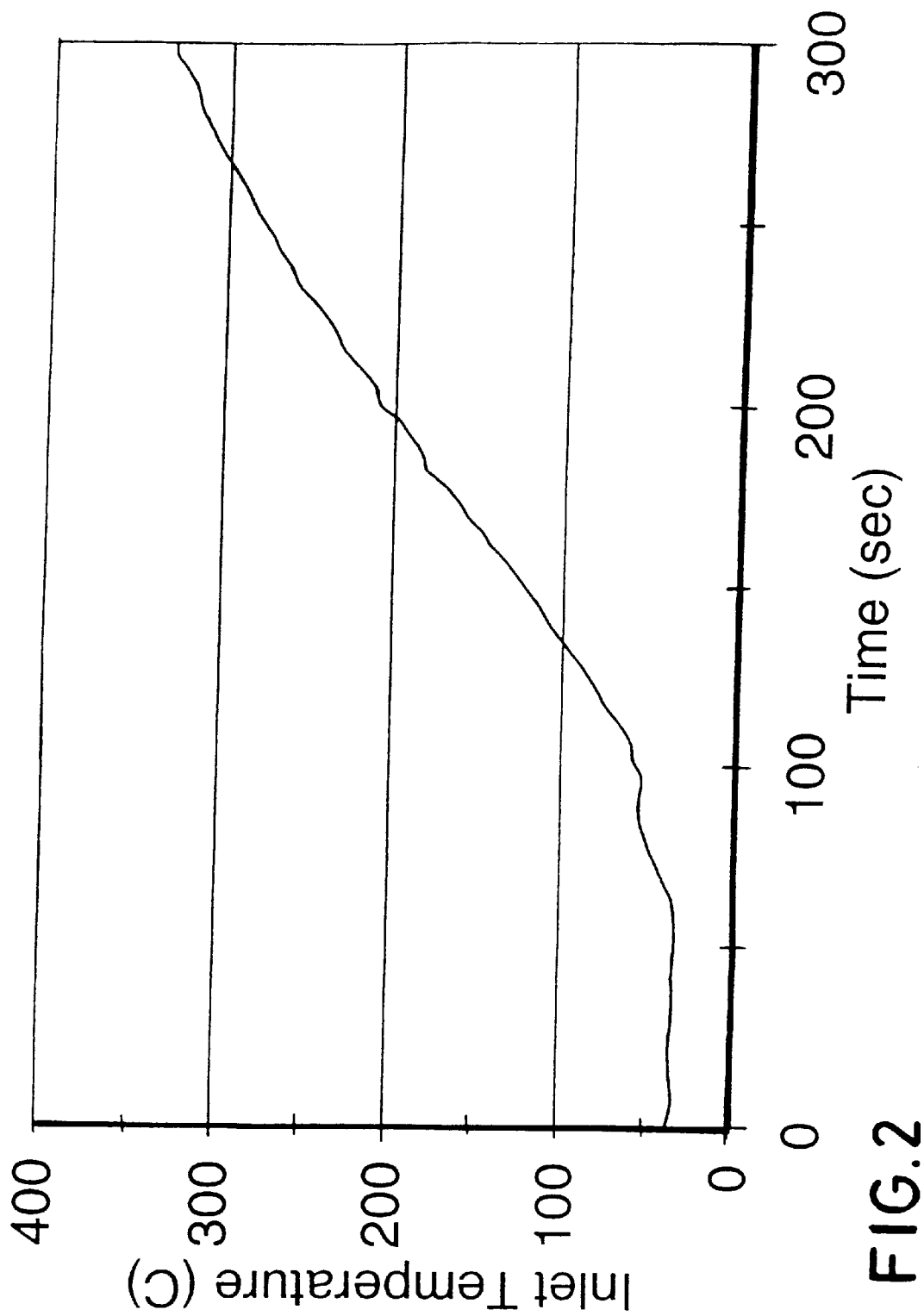
FIG. 2 is a graph of exhaust gas temperature against time in a test.
Figure 3:
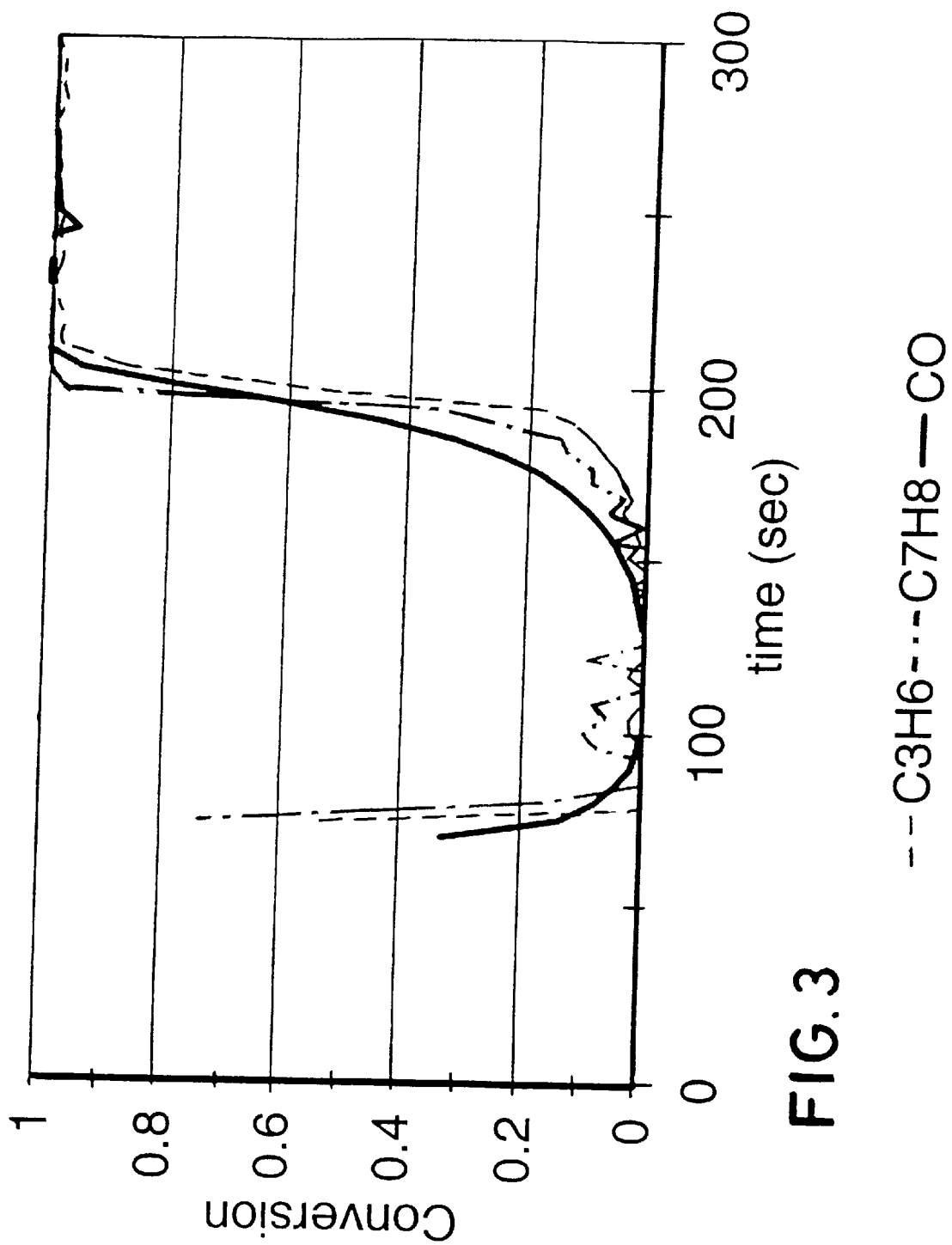
FIG. 3 is a graph of the conversion of three pollutants against time in the test, using a commercially available catalyst.
Figure 4:
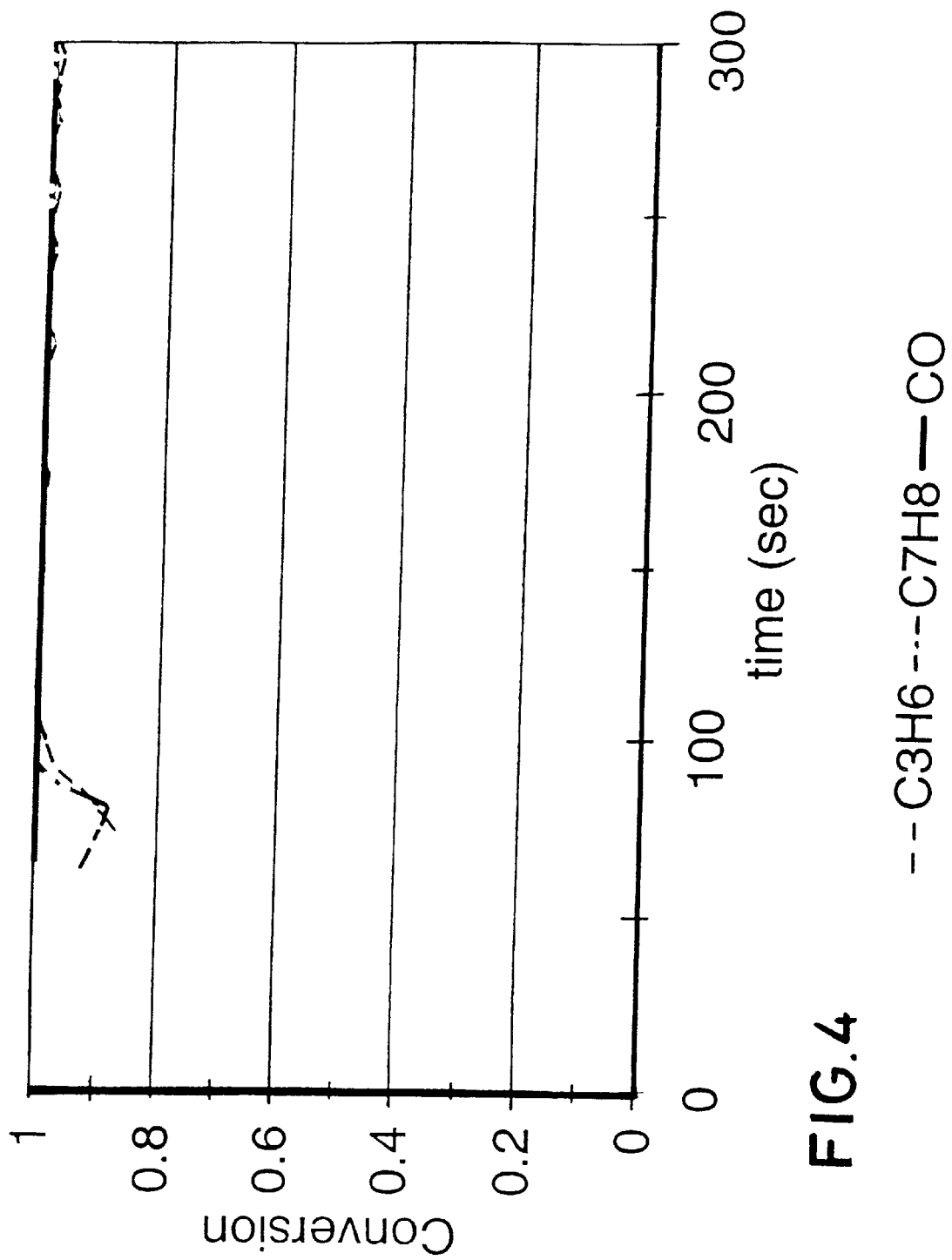
FIG. 4 is a graph of the corresponding conversion using a catalyst which can be used in accordance with the present invention.

A light-off experiment is conducted as follows: At the start of the experiment, the catalyst is blanketed by argon flow and the temperature at the inlet of the catalyst is held at 30° C. At time=65 seconds into the test, the synthetic exhaust gas mixture is introduced to the reactor at a gas hourly space velocity of 30,000. The temperature of the inlet exhaust gas is ramped as shown in FIG. 2. After reaching approximately 350° C., the reactor is held at that temperature for approximately 5 minutes, after which the exhaust gases are removed from the feed and the reactor is cooled down in a flow of dry air. After the catalyst reaches 30° C., the feed gas is switched back to argon and the experiment is repeated in a second run. FIGS. 3 and 4 show the light-off results over the two catalyst formulations in the second run. FIG. 3 (Comparative Example 1), giving the results for the commercial catalyst, shows that the CO and hydrocarbons light off (a conversion figure of 0.5) as a group at approximately 190–200 seconds into the run. FIG. 4 (Example 1), giving the results for the present catalyst under identical conditions, shows that it lights off almost instantly, converting all of the CO and nearly all of the hydrocarbon almost immediately after they have been introduced to the reactor. This illustrates that the present catalyst, when used with the present light-off strategy, produces remarkably fast light-off.

EXAMPLE 2 AND COMPARATIVE EXAMPLE 2

Figure 5:
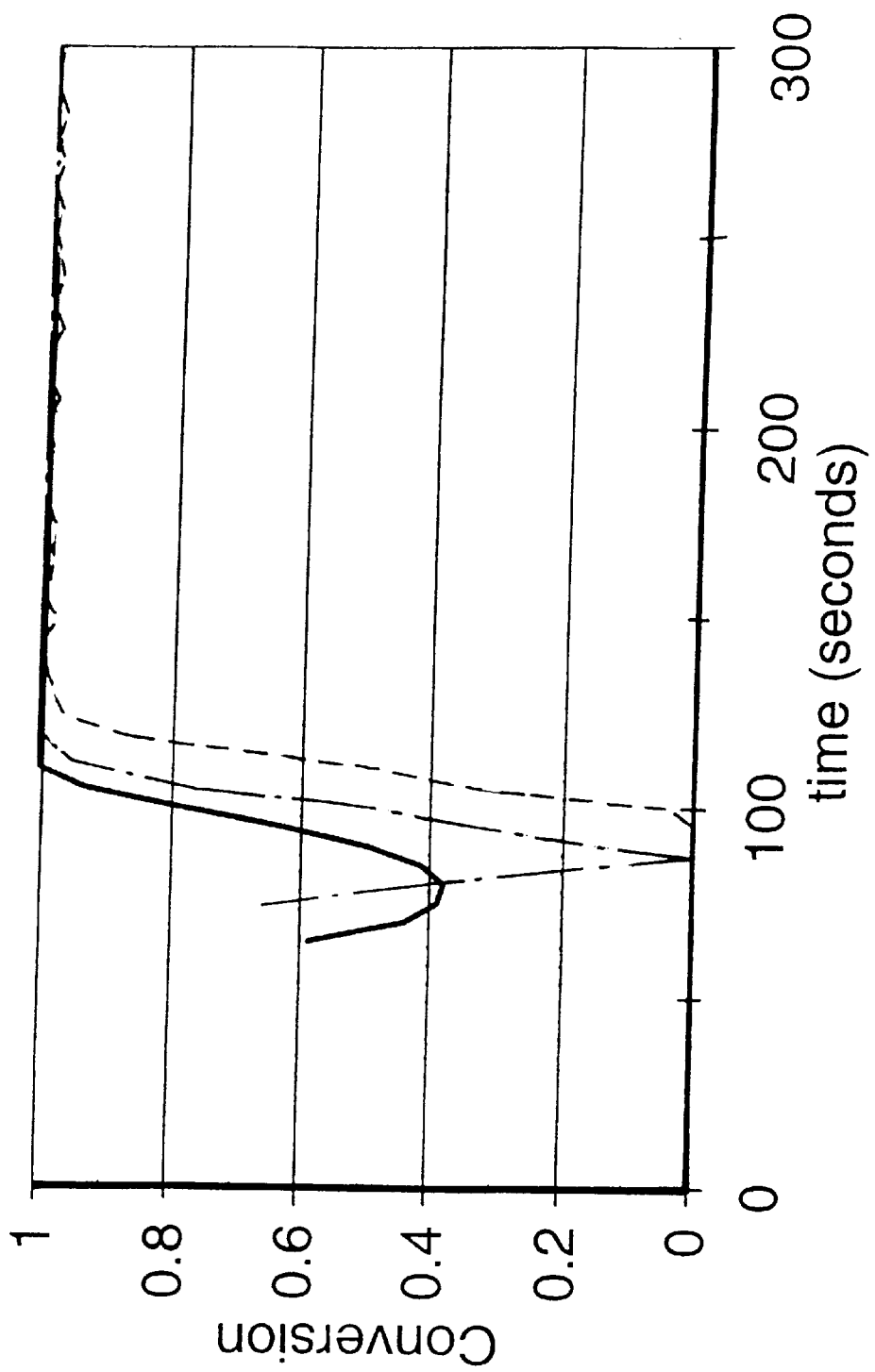
FIG. 5 is a graph of the corresponding conversion using the same catalyst but not dried.
Figure 6:
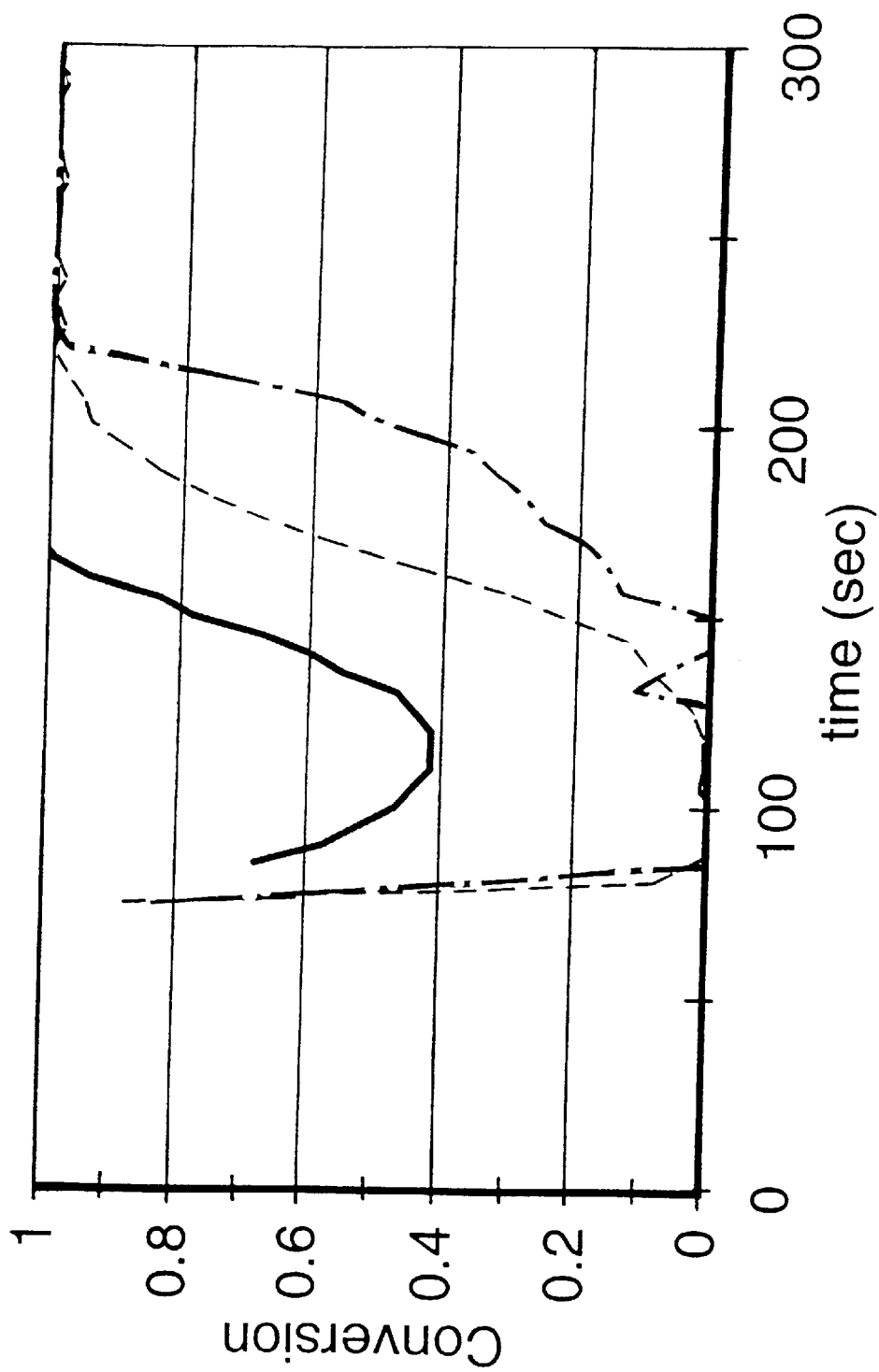
FIG. 6 is a graph of the corresponding conversion using a lower amount of CO in the feed.
Figure 7:
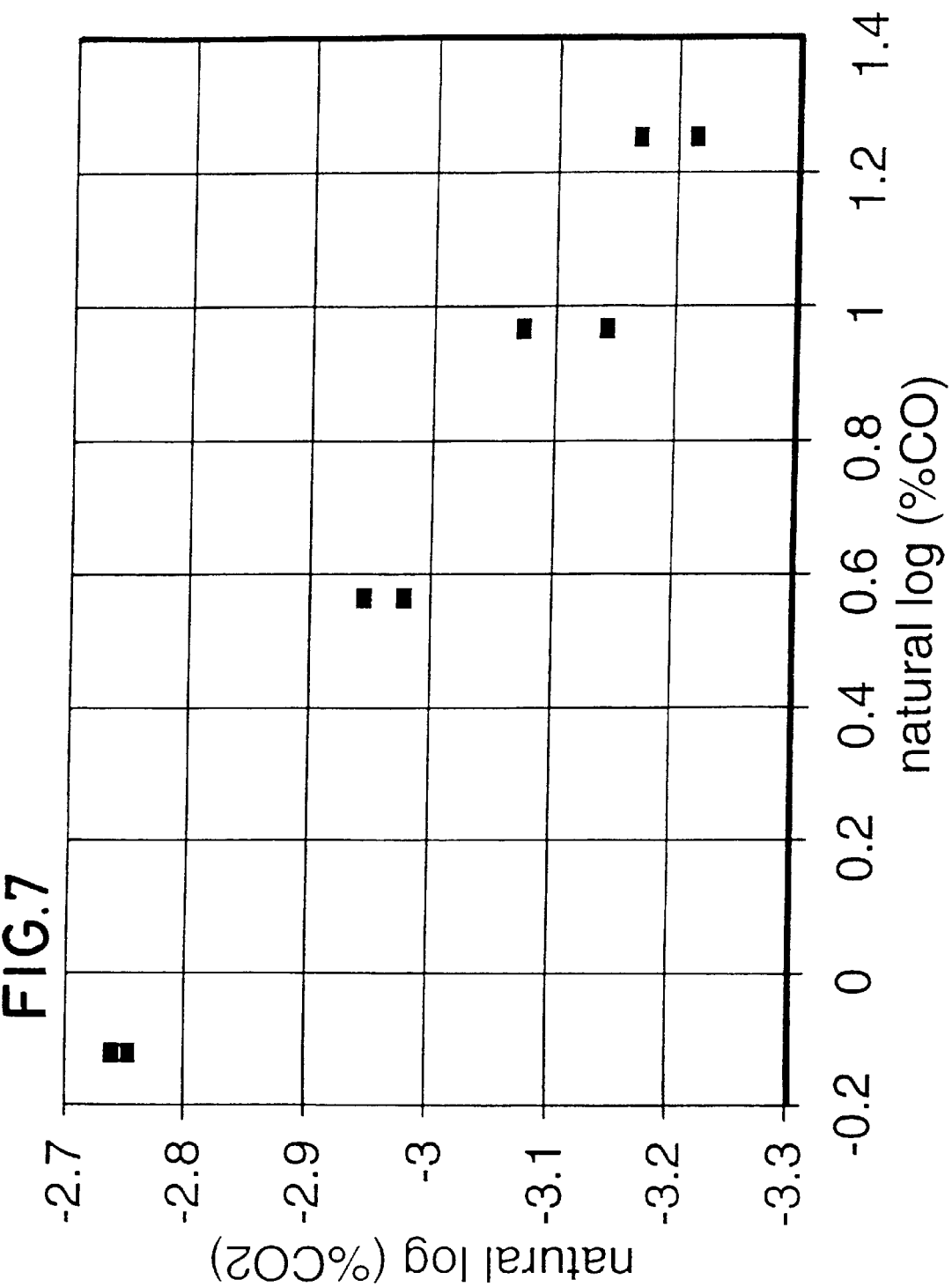
FIG. 7 is a CO reaction order plot for CO oxidation over the commercially available catalyst.

FIGS. 5 and 6 show the results from two light-off tests over the present catalyst carried out in the manner described in Example 1 except as noted. FIG. 5 (Example 2) shows the results of the first run using the catalyst fresh. FIG. 6 (Comparative Example 2) shows the results of a third run, carried out immediately after the second run but after again cooling the catalyst in dry air. In this run, all reactor conditions were kept the same except that the CO feed level was set to 0.5% throughout the entire run. A comparison of FIGS. 5 and 4 shows the benefits of performing the runs over a catalyst which has been "pre-dried". The initial starting condition of the catalyst is clearly important, as FIG. 5 (fresh catalyst) shows light-off at approximately 90–110 seconds in the first run, while when the catalyst has been "dried" in a flow of air before the second run, the light-off occurs almost instantly. The same improvement in light-off performance has been seen when the catalyst has been heated to 200° C. in nitrogen and then cooled down before starting an experiment. Comparison of FIGS. 4 and 6 show the advantages of increased CO levels in the feed at start-up. In FIG. 6, where a much lower amount of CO has been used at start-up (an amount insufficient for the exothermic reaction itself to generate enough heat to raise the temperature of the catalyst to the hydrocarbon light-off temperature), CO light-off is significantly delayed relative to that in FIG. 4. More importantly than the delayed CO light-off is the effect that this has on hydrocarbon light-off, which now occurs at approximately 170–200 seconds into the test. This demonstrates that the mechanism of the almost instant hydrocarbon light-off shown in FIG. 4 depends on the high CO level and almost instant CO conversion: the high temperature generated in the catalyst due to the high rate of the exothermic CO oxidation reaction leads to temperatures which exceed the hydrocarbon light-off temperature.

EXAMPLE 3 AND COMPARATIVE EXAMPLE 3

Figure 8:
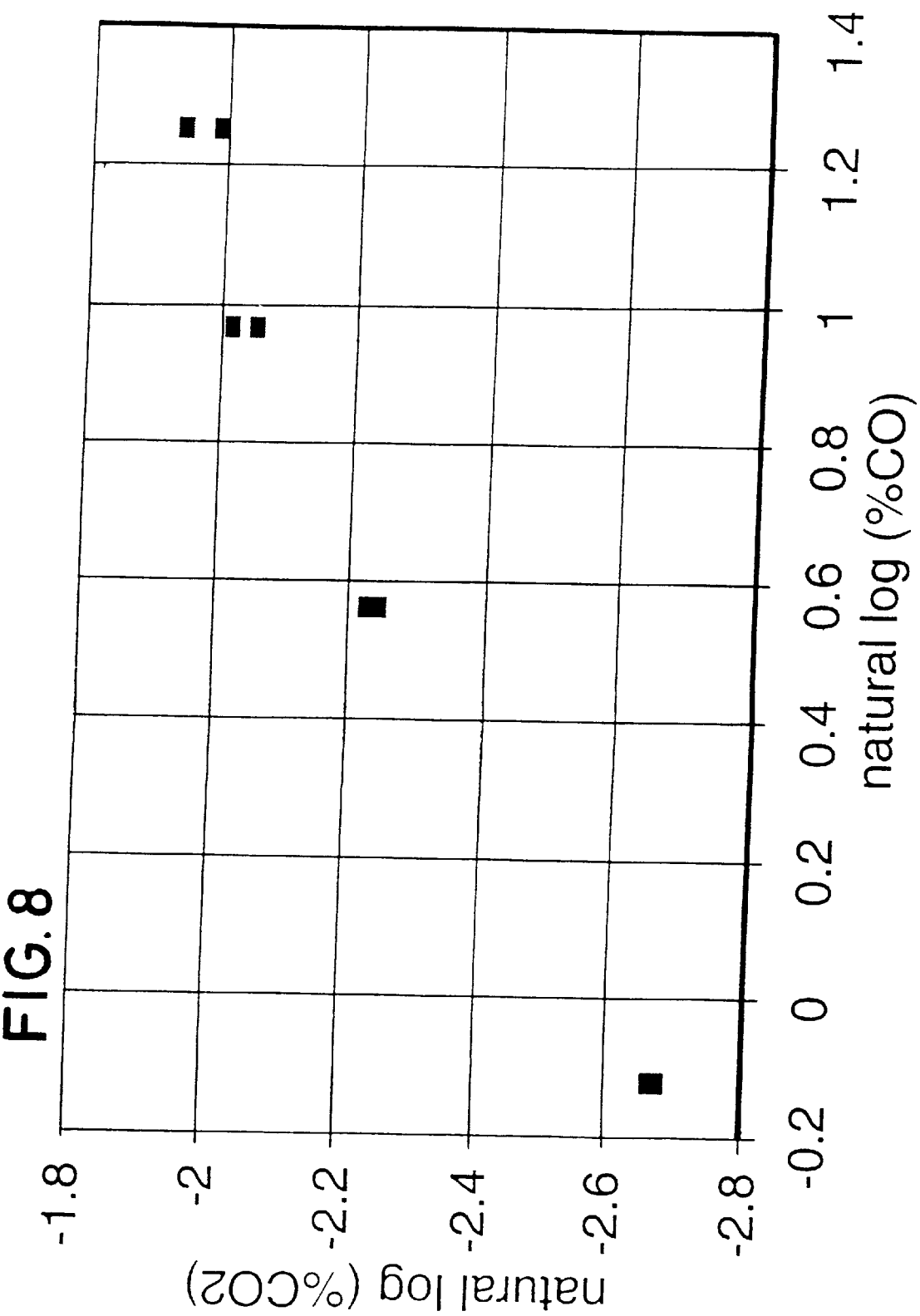
FIG. 8 is a corresponding plot for the present catalyst.

The effect of CO feed level on the rate of the CO oxidation reaction was examined under lean conditions (5% $O_2$, 1–4% CO) for the comparative (Comparative Example 3) and present (Example 3) catalysts described in Example 1 and Comparative Example 1, though the catalysts were employed in powder form (not coated on a monolith). The results are summarised in the Table and in FIGS. 7 and 8. As can be seen from FIG. 7, the comparative catalyst exhibits negative order CO kinetics for CO oxidation, meaning that increasing the amount of CO in the feed leads to a decreased rate of CO oxidation at feed levels of 1–4%. However, as shown in FIG. 8, the present catalyst exhibits the reverse, positive order kinetics. The reaction order for these two catalysts has been estimated, and as shown in the Table is positive for the present catalyst and slightly negative for the comparative catalyst. This is an important desideratum for a catalyst to light-off high levels of CO in an exhaust stream.

TABLE

| Catalyst | CO reaction order |
|---|---|
| Comparative | −0.3 |
| Present | 0.5 |

EXAMPLE 4 AND COMPARATIVE EXAMPLES 4–6

Figure 9:
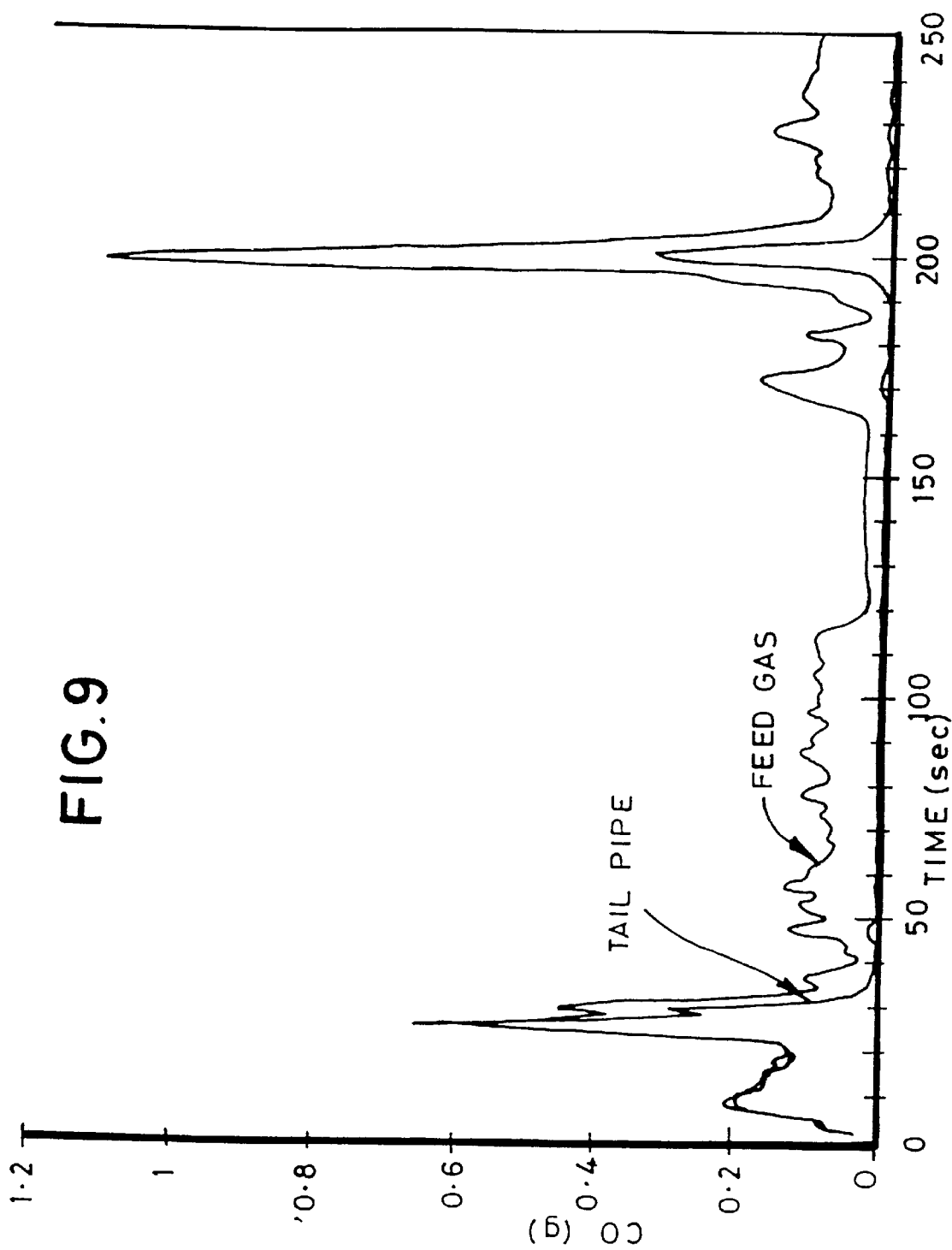
FIG. 9 is a graph of CO in grams against time into a United States Federal test for the commercially available catalyst.
Figure 10:
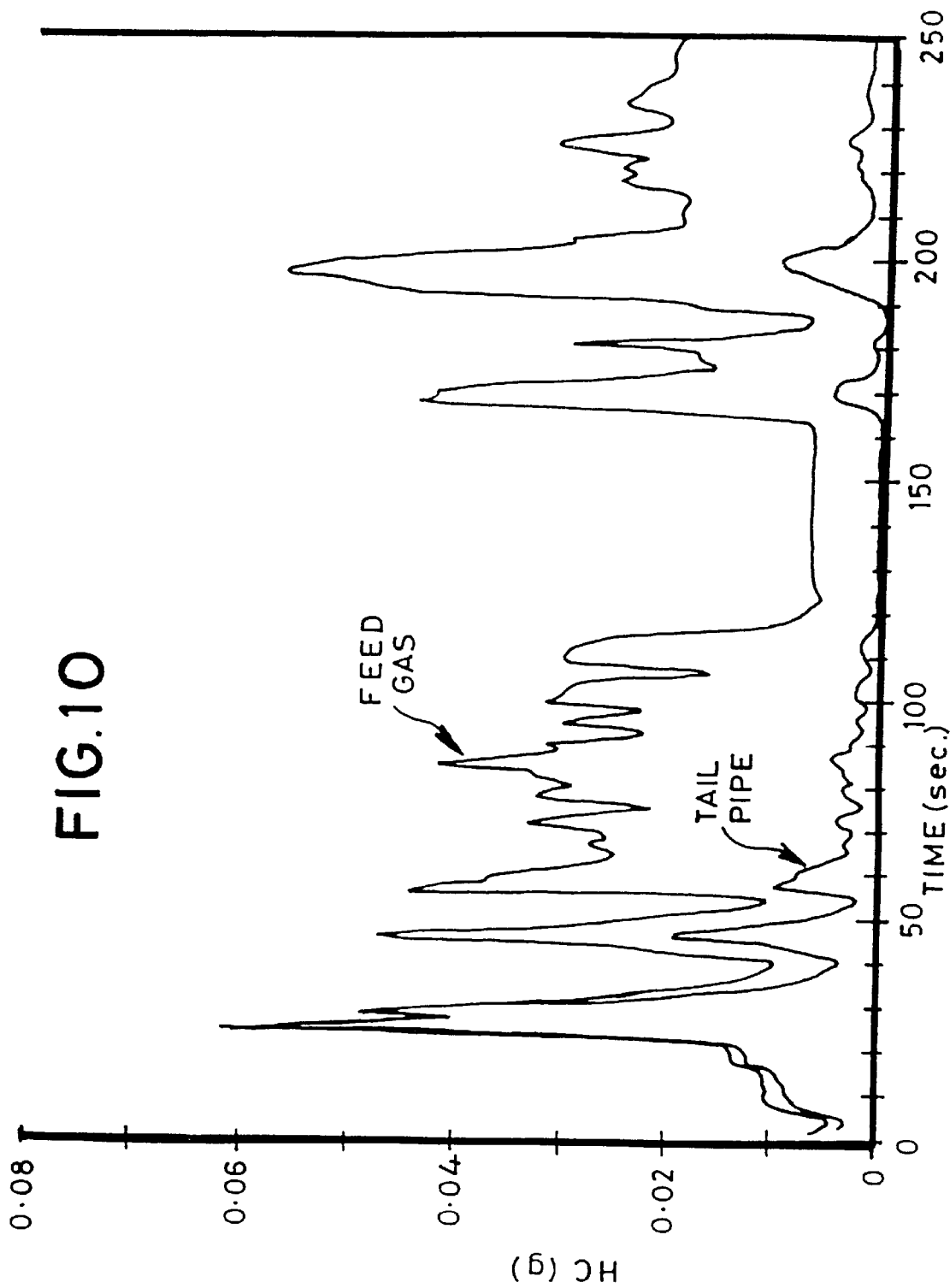
FIG. 10 is a corresponding graph of hydrocarbon against time.
Figure 11:
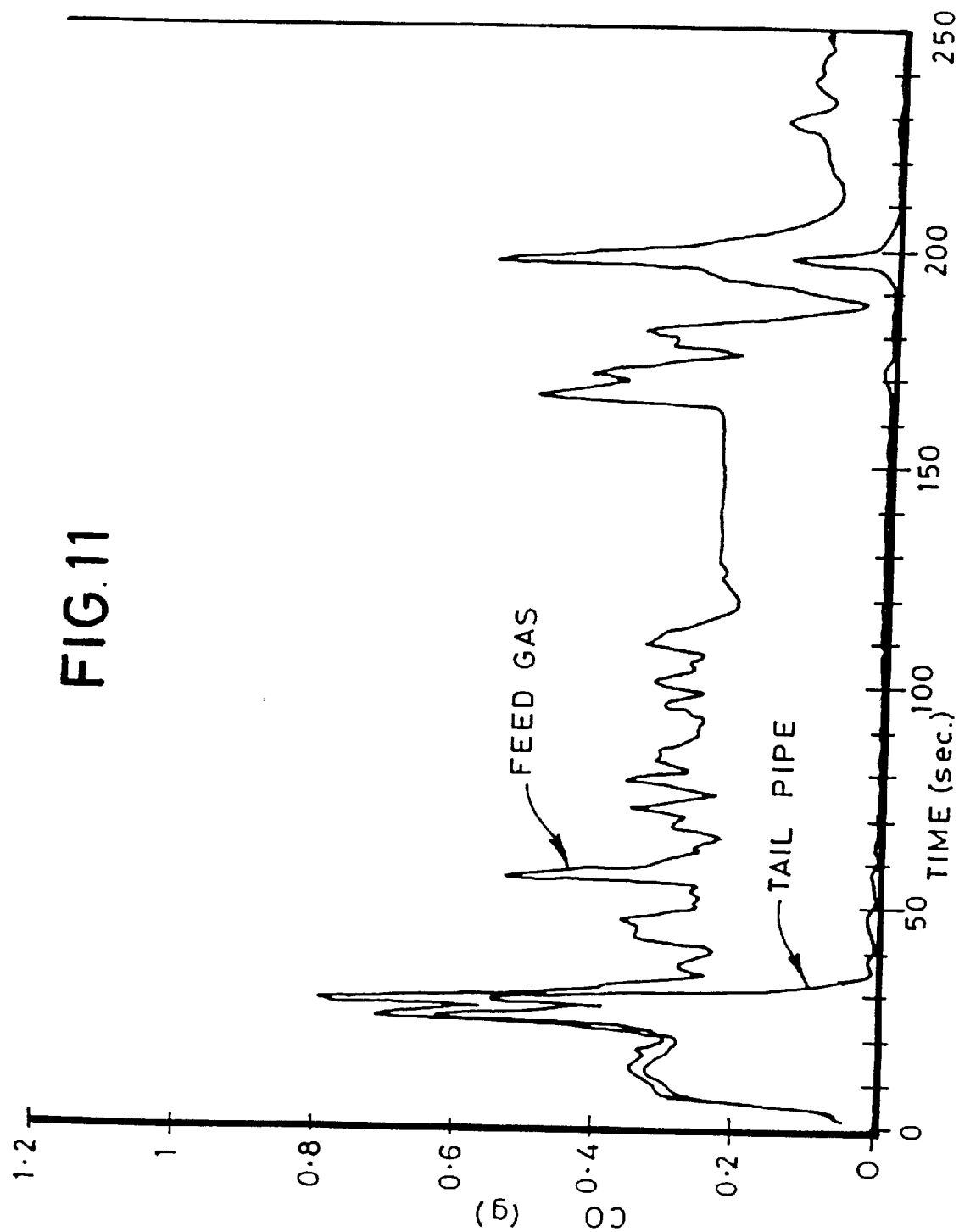
FIG. 11 is a graph of CO in grams against time for the same catalyst after drying in the same test but with a higher amount of CO and $O_2$ in the feed-gas.
Figure 12:
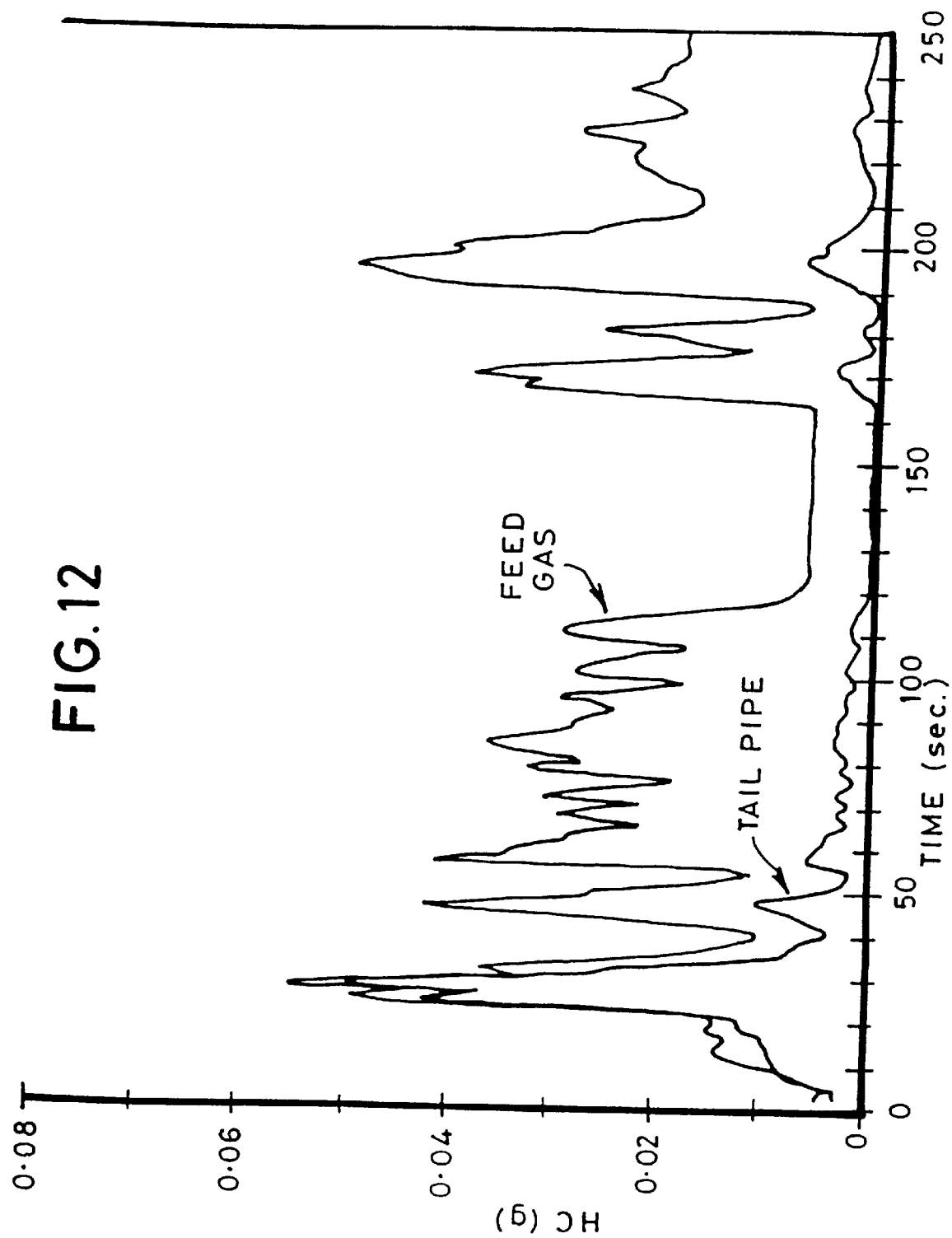
FIG. 12 is a corresponding graph of hydrocarbon against time.
Figure 13:
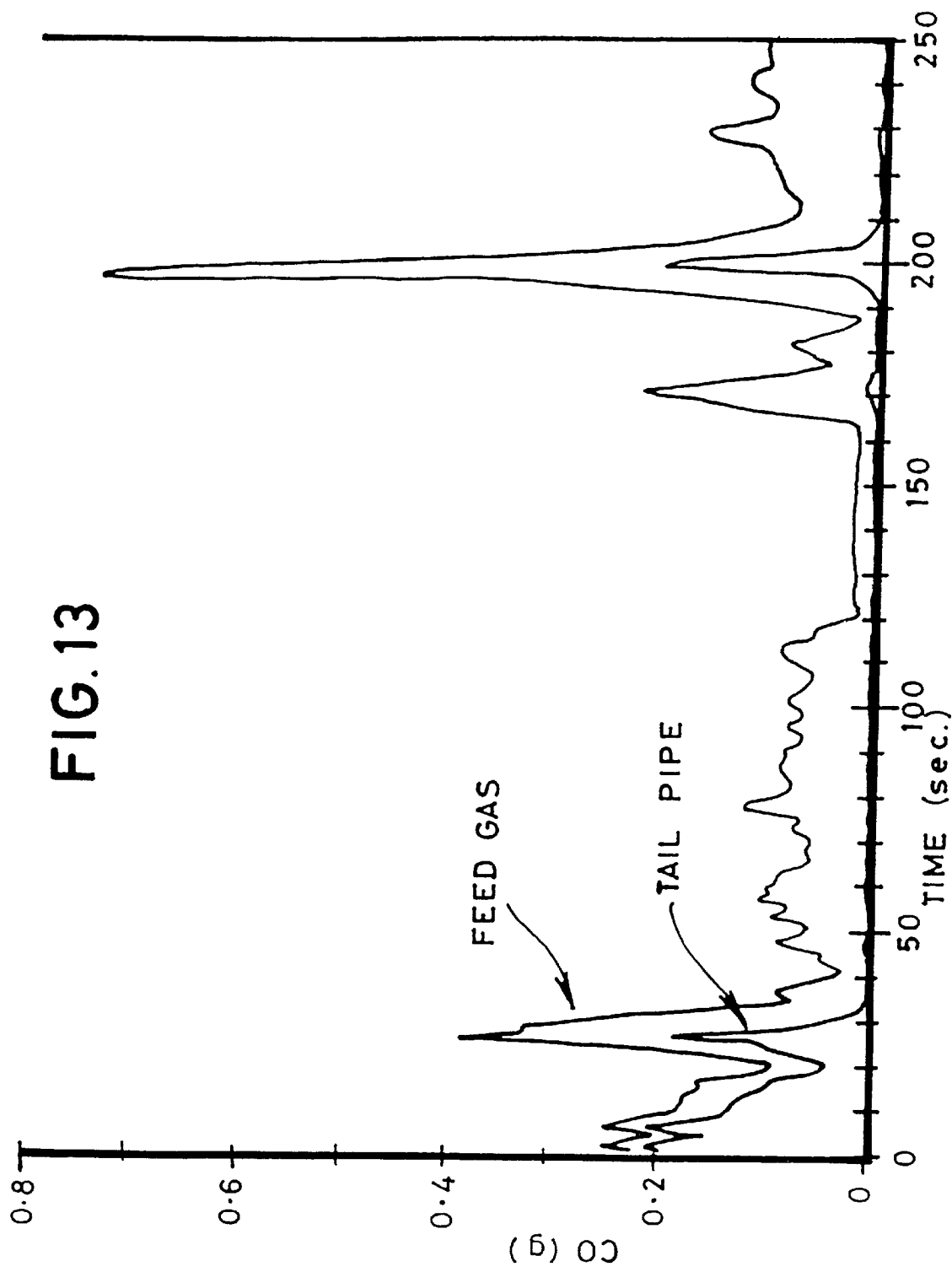
FIG. 13 is a graph of CO in grams against time for the present catalyst after drying in the same Federal test except for an additional air source.
Figure 14:
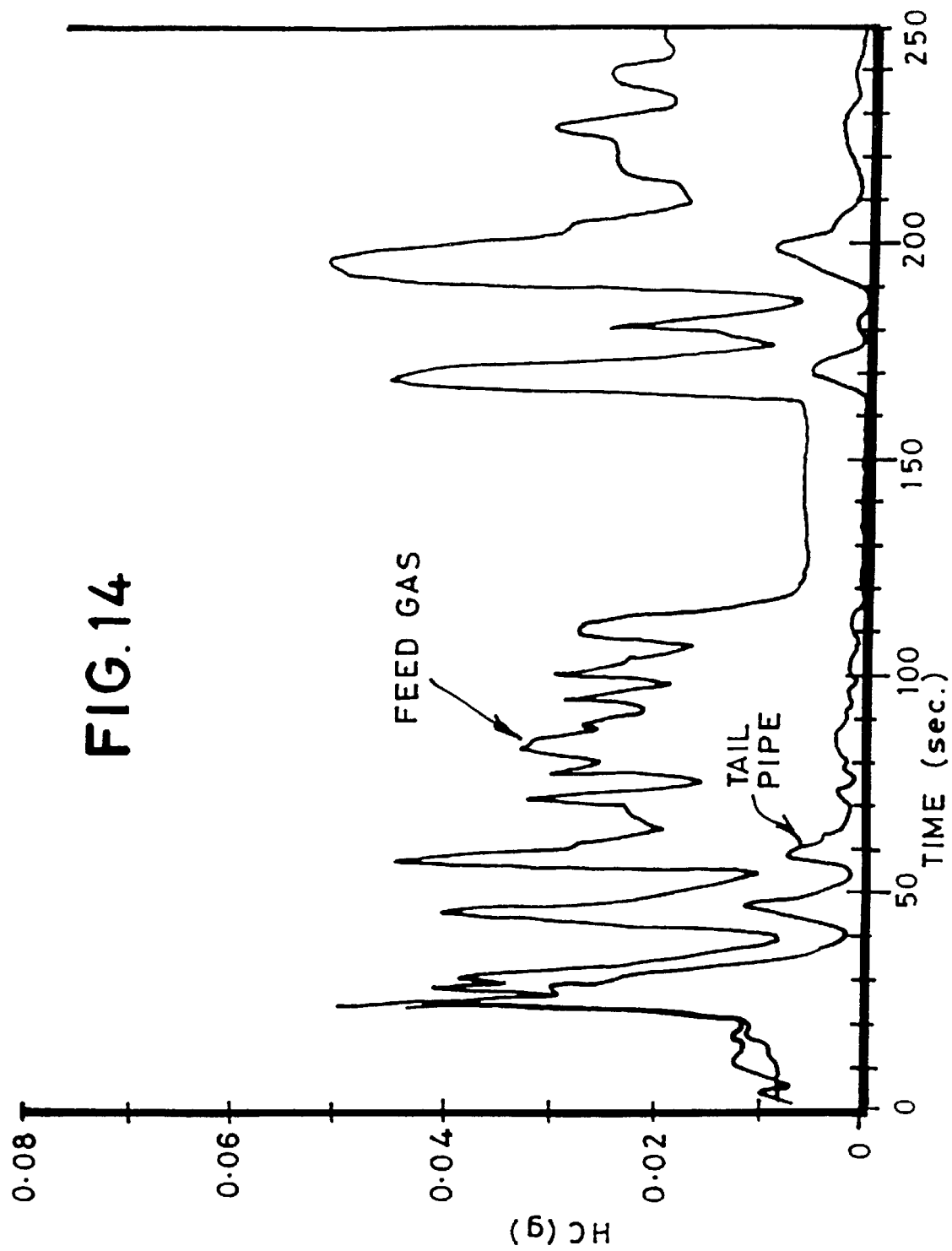
FIG. 14 is a corresponding graph of hydrocarbon against time.
Figure 15:
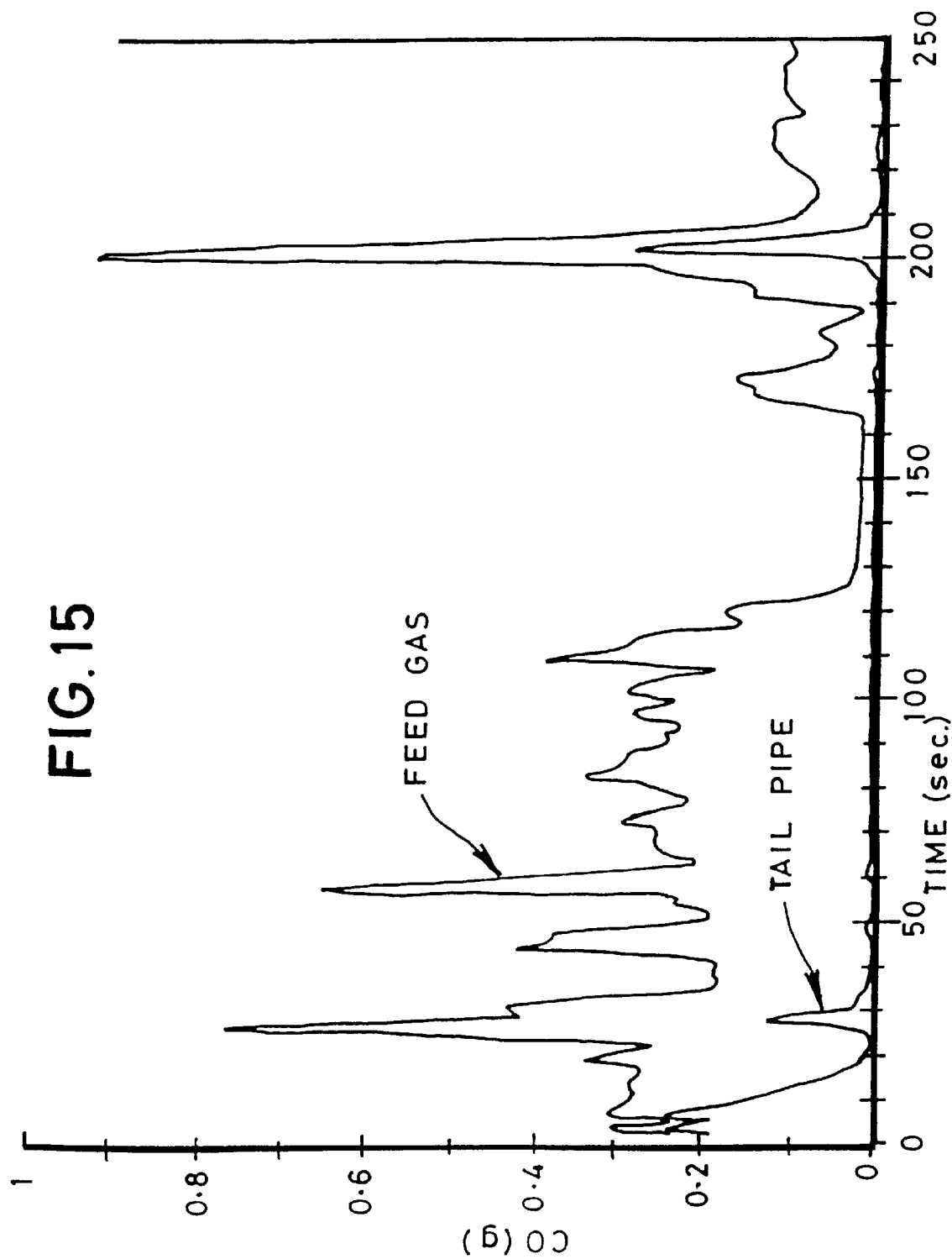
FIG. 15 is a graph of CO in grams against time for the same catalyst in the same test but with a higher amount of CO and $O_2$ in the feed-gas.
Figure 16:
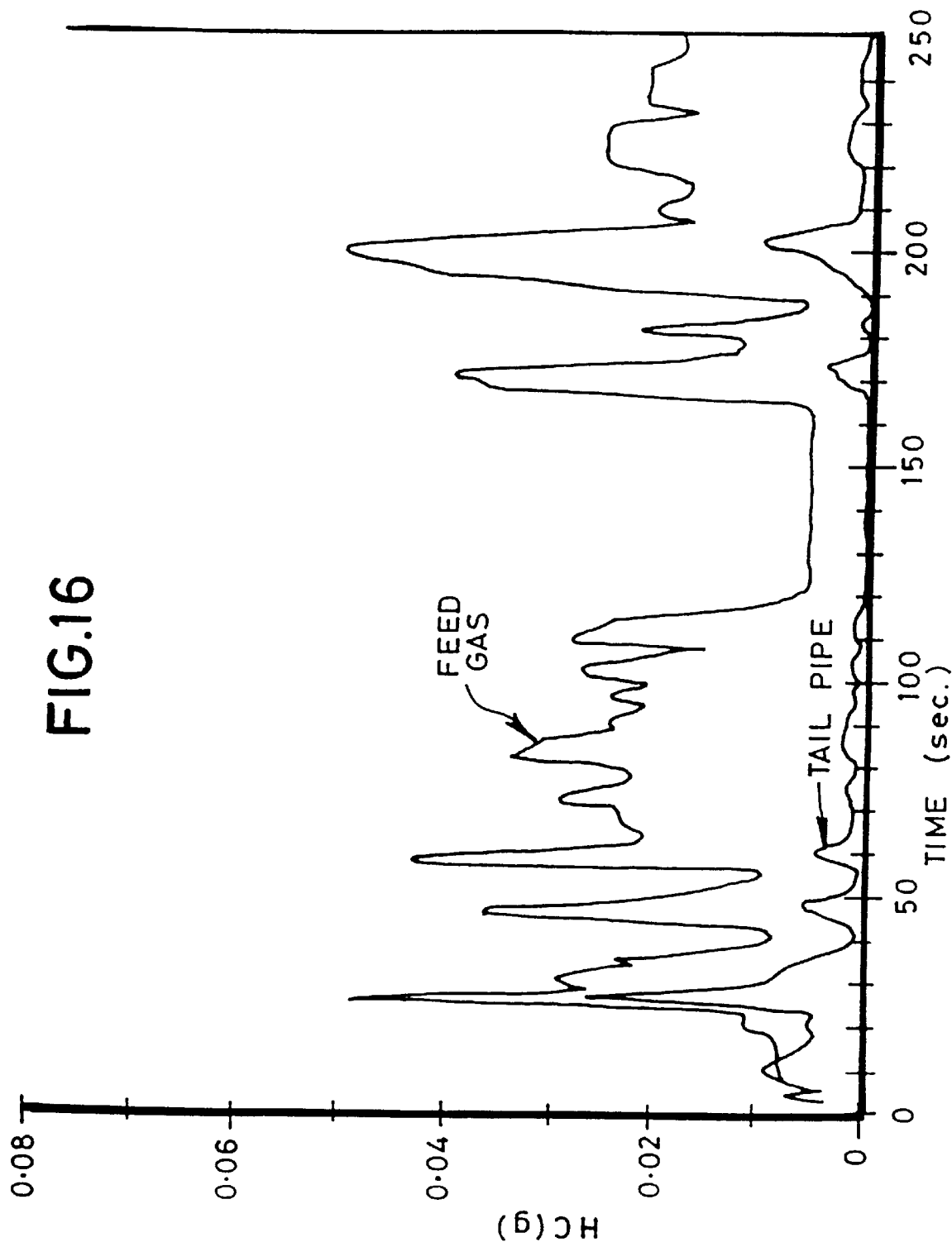
FIG. 16 is a corresponding graph of hydrocarbon against time.

Tests of light-off performance for the comparative (Comparative Examples 4 and 5) and present (Example 4 and Comparative Example 6) catalysts described in Example 1 and Comparative Example 1 have been performed on a petrol-fuelled 2 liter Ford Contour car. The volume of catalyst and monolith was 0.7 liter. The washcoat (catalytically active material plus support) loading was 3g per cubic inch (0.18 g per cubic cm). The catalysts have been tested in a United States Federal Test Procedure (FTP) test in the front underfloor position. FIGS. 9 and 10 show the performance of the comparative catalyst during test 1, in which the standard start-up strategy was utilised. The normal configuration of this automobile is rich start-up. FIG. 9 shows feed gas (pre-catalyst) and tailpipe (post-catalyst) CO levels in terms of g/s. As can be seen from this plot, the CO light-off occurs at about 40 seconds into the test. FIG. 10 shows the results for hydrocarbons, with the light-off again occurring at about 40 seconds into the test. FIGS. 11 and 12 show the same catalyst in a second test in which the amount of CO in the feed gas has been increased significantly (the $O_2$ level was also increased, in order to keep the same stoichiometry as in the test whose results are shown in FIGS. 9 and 10). In between test 1 and test 2, dry nitrogen was blown over the catalyst in order to "dry" the catalyst. As can be seen from FIGS. 11 and 12, there is virtually no advantage seen due to the higher inlet CO levels and the drying of the catalyst. The light-off times for each of these pollutants is almost unchanged. FIGS. 13 and 14 show the lean light-off performance (Comparative Example 6) of the present catalyst using the normal engine start-up, except that an additional air source has been attached in order to ensure lean conditions over the catalyst at start-up. This experiment is the fourth in a series, so the catalyst has already undergone the "drying" treatment described above. These Figures show an improvement in emissions compared to the results for the comparative catalyst shown in FIGS. 9–12, thus indicating the advantages of the present catalyst under these start-up conditions. FIGS. 15 and 16 show the performance (Example 4) of this catalyst in the FTP test where additional CO and $O_2$ have been injected over the catalyst as described above. Here, a marked advantage in both CO and hydrocarbon light-off is observed as a result of the higher levels.

EXAMPLES 5 AND 6

Figure 17:
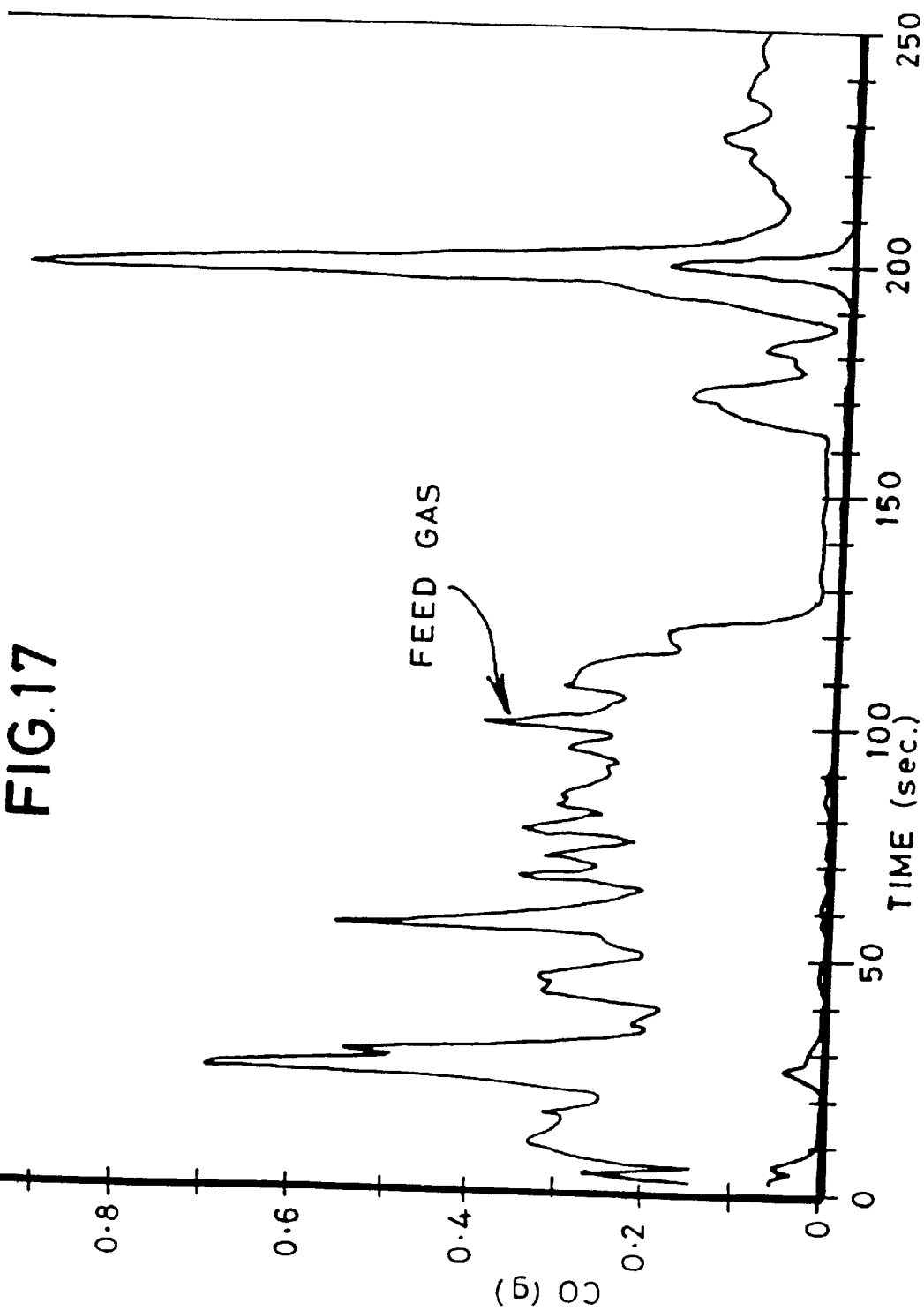
FIG. 17 is a graph of CO in grams against time for the present catalyst positioned further from the engine.
Figure 18:
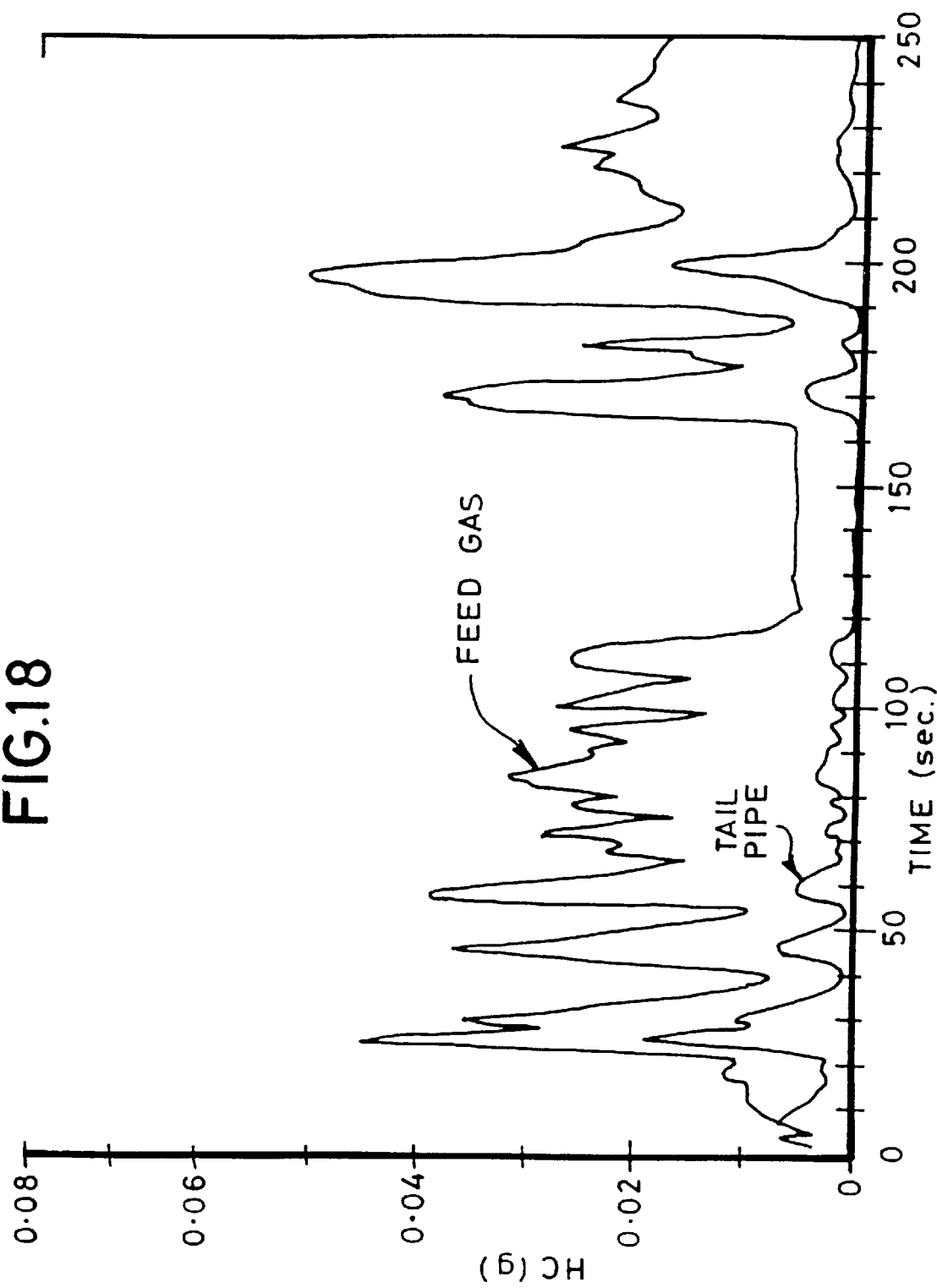
FIG. 18 is a corresponding graph of hydrocarbon against time.
Figure 19:
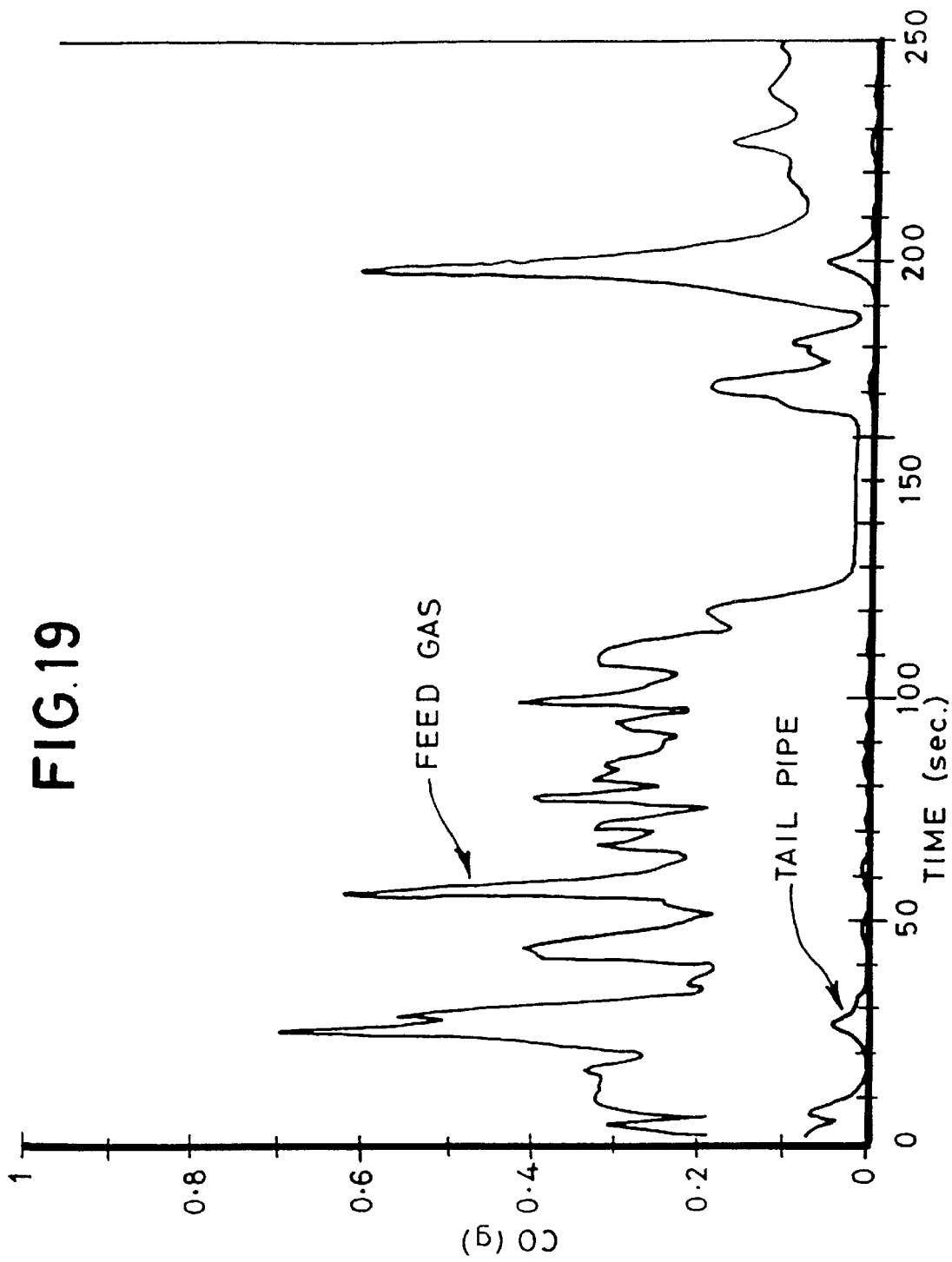
FIG. 19 is a graph of CO in grams against time for the present catalyst having up-stream a hydrocarbon trap and up-stream of that a water trap.
Figure 20:
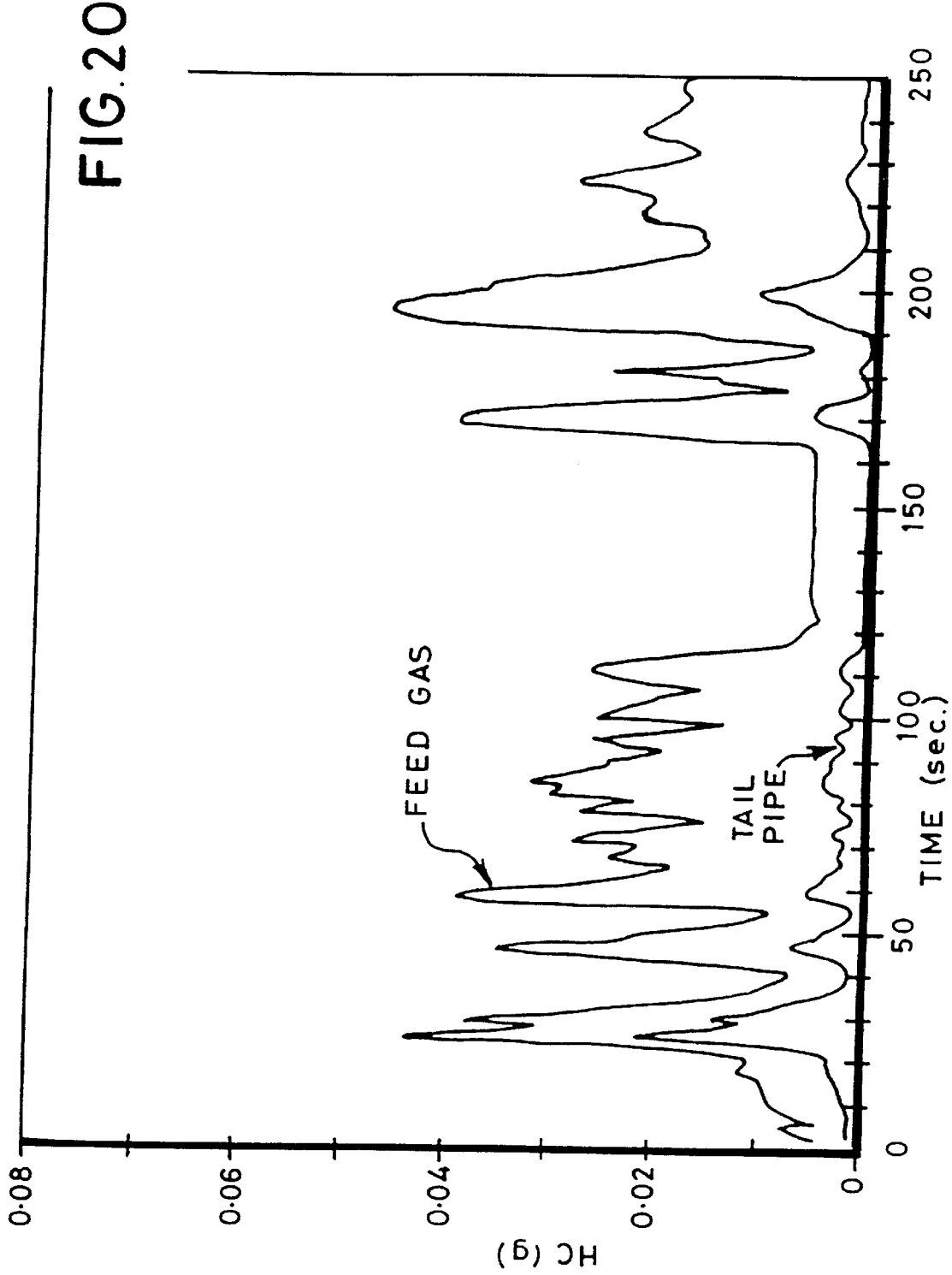
FIG. 20 is a corresponding graph of hydrocarbon against time.

Tests of the light-off performance of the present catalyst as described in Example 4 with and without a combination of a water trap and a hydrocarbon trap have been performed on a Ford Contour. The lean start-up with enhanced CO as discussed at the end of Example 4 was employed. FIGS. 17 and 18 show the results (Example 5) from test 1, in which the front underfloor position is occupied by a bare monolith and the rear underfloor position is occupied by the present catalyst. The excellent performance of the present catalyst is again shown (this is the second run in a series, and thus is following the drying procedure discussed in Example 4). It is evident from FIG. 18, however, that in the first 10 seconds of the test the hydrocarbon is not converted. This is because the catalyst has not yet heated up enough to convert the hydrocarbons in the first 10–15 seconds. FIGS. 19 and 20 show the results (Example 6) from test 2, in which the front underfloor position now contains a half-size brick coated with zeolite 5A (a desiccant material) followed by half-sized brick coated with ZSM5 ( a hydrocarbon trap). The rear underfloor position again contains the present catalyst. The excellent performance for CO oxidation is again shown in FIG. 19. FIG. 20 shows that the hydrocarbon trap effectively reduces the hydrocarbon emissions in the first 10–15 seconds of the experiment.

EXAMPLE 7 AND COMPARATIVE EXAMPLE 7

Figure 21:
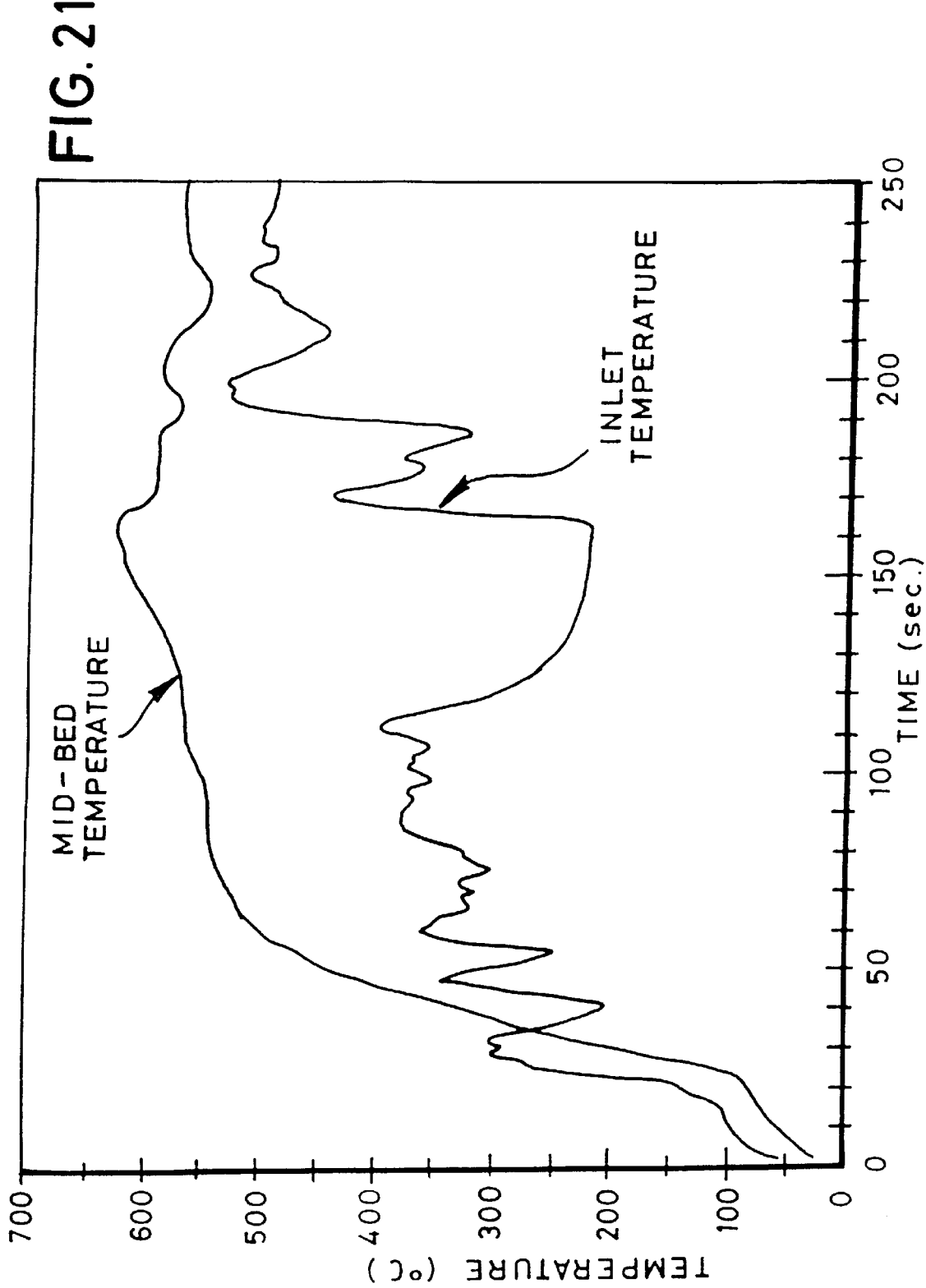
FIG. 21 is a graph of exhaust gas and catalyst temperature against time for the commercially available catalyst.
Figure 22:
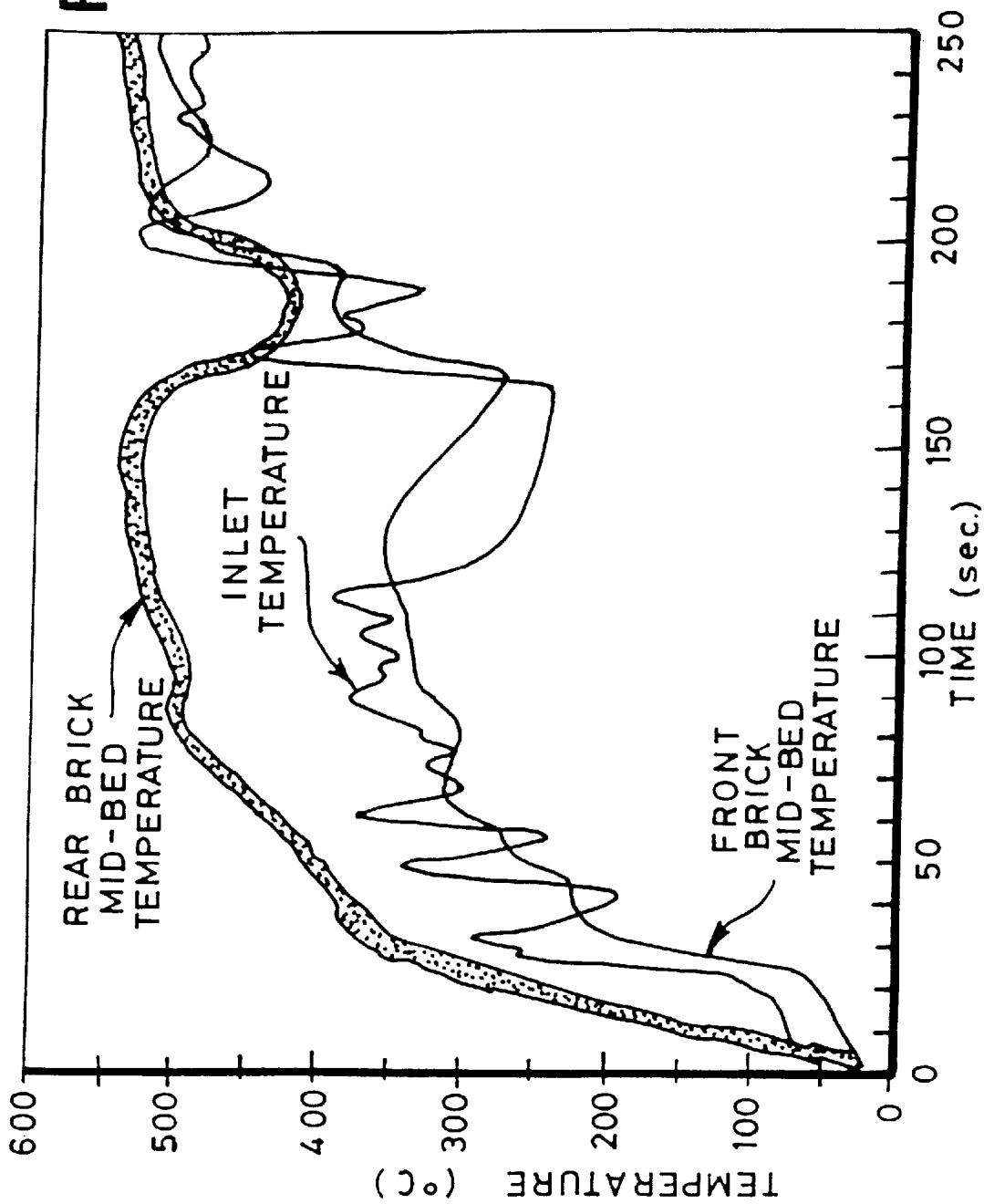
FIG. 22 is a graph of exhaust gas and catalyst temperature against time for the present catalyst.

The temperature of the catalyst has been measured (in Comparative Example 7) during test 2 of Comparative Example 5, in which the comparative catalyst occupies the front underfloor position, and additional CO has been added to the exhaust feed. These results are shown in FIG. 21. It is clear that the catalyst "mid-bed" temperature remains below the catalyst inlet temperature (measured at a point just in front of the front underfloor position) throughout the first 35 seconds. The relevant temperatures have also been measured (in Example 7) during test 1 of Example 5, in which the present catalyst has been used in the rear underfloor position and a blank brick occupies the front underfloor position. These results are shown in FIG. 22. The inlet temperature, which is still measured at the inlet to the front underfloor position, is virtually identical to that shown in FIG. 21. The trace for the front underfloor position, which is now non-catalytic, looks similar to the first 35 seconds of the comparative catalyst mid-bed temperature (before light-off occurs on the brick in FIG. 21). However, the temperature of the rear underfloor brick (the present catalyst) increases very rapidly, reaching 200° C. in the first 15 seconds of operation. It is important to note that this rapid catalyst heating occurs not due to the specific heat coming from the engine, but due to the heat of reaction from the CO, hydrogen and hydrocarbon combustion over the catalysts. The rapid temperature rise of the present catalyst shown in FIG. 22 illustrates a further advantage of the present invention, in that a thermocouple placed within the catalyst may be simply used as a diagnostic means for catalyst performance.

EXAMPLE 8

Figure 23:
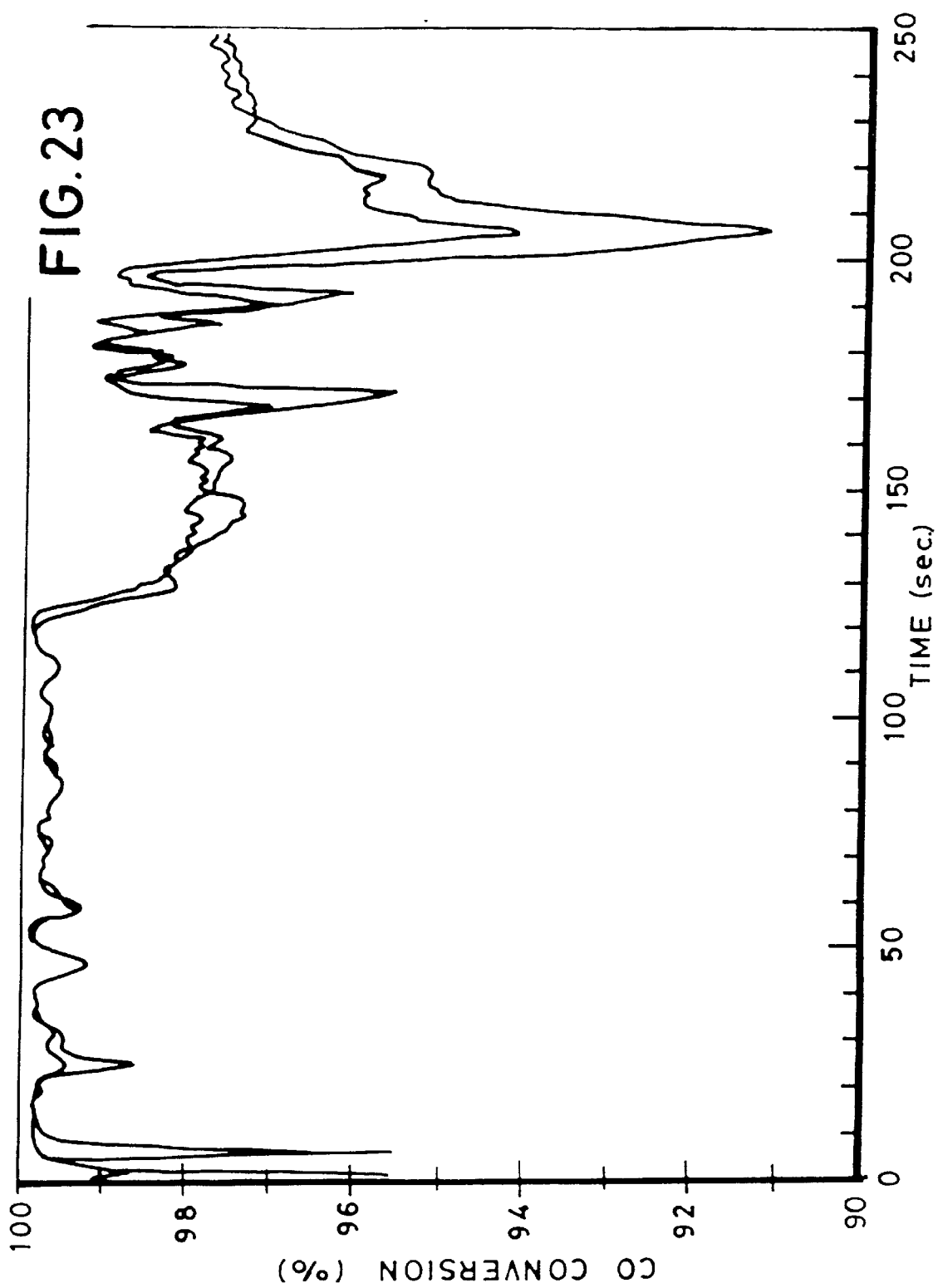
FIG. 23 is a graph of % CO conversion against time for a different catalyst used in accordance with the present invention.

A catalyst has been prepared according to the following recipe: Tetraamine platinum hydrocarbonate (TPtHC) was dissolved in citric acid, and added to a $Pd(NO_3)_2$ solution. This solution was then mixed with a solid ceria-zirconia mixed oxide, which was 70% $CeO_2$ and 30% $ZrO_2$ by weight. This slurry was warmed gently to drive off the excess liquid, dried overnight, and then calcined at 500° C. for 2 hours. The resulting catalyst was 4% Pd and 2% Pt by mass. This catalyst was then coated onto monolith substrates at a loading of $3g/in^3$ ($0.18$ $g/cm^3$), and loaded into the two under-floor positions of the Ford Contour. FTP test were run with the enhanced CO and air feed at start-up as discussed in Examples 4 and 5. FIGS. 23 and 24 show the conversion of CO and hydrocarbon as a function of time at start-up for two consecutive runs. It can be seen from FIG. 23 that CO conversion is above 90% practically immediately, and remains high throughout the first 250 seconds of the test. FIG. 24 shows that hydrocarbon conversion remains high throughout the crucial start-up phase of the test. Outstanding low temperature light-off behaviour has been achieved.

What we claim is:

1. A combination of an internal combustion engine and an exhaust apparatus connected to said engine, wherein said exhaust apparatus comprises a CO oxidation catalyst to convert CO and/or hydrogen in an exhaust gas leaving the engine to $CO_2$ and/or $H_2O$ by reaction with oxygen, and a hydrocarbon oxidation catalyst to convert hydrocarbon in the exhaust gas leaving the engine to $CO_2$ and water by reaction with oxygen, by contacting the engine exhaust gas comprising CO, hydrogen and hydrocarbon with the CO oxidation catalyst and simultaneously or subsequently thereto contacting said exhaust gas with the hydrocarbon oxidation catalyst, wherein the CO oxidation catalyst is of light-off temperature for CO and/or hydrogen below ambient temperature under internal combustion engine exhaust operating conditions, and wherein control means are provided to control the engine so that on starting the engine at ambient temperature the exhaust gas produced by the engine, optionally, supplemented by secondary sources of oxygen, CO and/or hydrogen, and contacting the CO oxidation catalyst contains sufficient oxygen and sufficient CO and/or hydrogen so that an exothermic reaction of the oxygen with the CO and/or hydrogen on the CO oxidation catalyst generates enough heat to raise a temperature of the CO oxidation catalyst from ambient temperature to at least the light-off temperature of the hydrocarbon oxidation catalyst.

2. A combination according to claim 1 wherein said control means control the engine so that the exhaust gas contacting the CO oxidation catalyst contains sufficient oxygen that substantially all the CO and/or hydrogen in the exhaust gas is reacted by the CO oxidation catalyst.

3. A combination according to claim 1 or 2 wherein the CO oxidation catalyst comprises either a material which is catalytically active for the oxidation of both CO and hydrocarbon or a mixture of a material which is catalytically active for CO oxidation and a material which is catalytically active for HC oxidation.

4. A combination according to claim 1, wherein the CO oxidation catalyst is of positive order kinetics with respect to CO in the CO oxidation reaction.

5. A combination according to claim 1 wherein the CO oxidation catalyst is composed of metal oxide particles among which are uniformly incorporated noble metal particles, wherein an interaction between the noble metal particles and the metal oxide particles of said CO oxidation catalyst, without a hydrogen reduction pre-treatment, results in the formation of anionic vacancies on the metal oxide particle surface at a first temperature lower than a second temperature at which said anionic vacancies form on a corresponding catalyst, without said hydrogen reduction pre-treatment, containing the same amount of the metal oxide particles and noble metal particles as the CO oxidation catalyst and wherein said corresponding catalyst is prepared by impregnating metal oxide particles with a noble metal precursor and calcining to convert the precursor to noble metal particles.

6. A combination according to claim 5 wherein the metal oxide particles comprise one or more of $CeO_2$, $ZrO_2$, $TiO_2$ and $SnO_2$.

7. A combination according to claim 1 wherein the CO oxidation catalyst comprises one or both of platinum and palladium.

8. A combination according to claim 1 wherein the exhaust apparatus further comprises a catalyst to reduce nitrogen oxides in the exhaust gas to nitrogen.

9. A combination according to claim 1 wherein the exhaust apparatus further comprises a hydrocarbon trap located upstream of the HC oxidation catalyst which traps hydrocarbon from the exhaust gas at a first temperature and releases said trapped hydrocarbon at a second higher temperature to subsequently contact the HC oxidation catalyst.

10. A combination according to claim 9 wherein the hydrocarbon trap comprises a zeolite.

11. A combination according to claim 1 wherein the exhaust apparatus further comprises means to sweep gas through the CO oxidation catalyst before starting the engine.

12. A combination according to claim 11 wherein the means to sweep gas is means to sweep heated air.

13. A combination according to claim 1 wherein the exhaust apparatus contains means to dry, or keep dry, the CO oxidation catalyst before the exhaust gas contacts said CO oxidation catalyst.

14. A combination according to claim 13 wherein the means to dry the CO oxidation catalyst comprises a pump to provide a stream of gas over the CO oxidation catalyst after switching off the engine.

15. A combination according to claim 1 wherein the exhaust apparatus further comprises a water trap located upstream of said CO oxidation catalyst to trap water on starting the engine at ambient temperature before the water can contact the CO oxidation catalyst.

16. A combination according to claim 1 wherein the exhaust apparatus further comprises at least one three-way catalyst, to convert CO in the exhaust gas to $CO_2$ by reaction with oxygen, hydrocarbon in the exhaust gas to $CO_2$ and water by reaction with oxygen, and nitrogen oxides in the exhaust gas to nitrogen, wherein said three-way catalyst is located downstream of said CO oxidation catalyst.

17. A combination according to claim 1 wherein said engine provides power to a vehicle.

18. A combination according to claim 17 wherein the exhaust apparatus further comprises means to use the heat from the exhaust gas before said exhaust gas contacts the CO oxidation catalyst in order to heat an interior of the vehicle, wherein said means to use the heat is located upstream of the CO oxidation catalyst.

19. A combination according to claim 17 wherein the exhaust apparatus further comprises means to use the heat from the exhaust gas after said exhaust gas contacts the hydrocarbon oxidation catalyst in order to heat an interior of the vehicle, wherein said means to use the heat is located downstream of the hydrocarbon oxidation catalyst.

20. A combination according to claim 1 wherein a temperature measuring device measures a temperature of the CO oxidation catalyst or the hydrocarbon oxidation catalyst, and said temperature measuring device is linked to and controls a display which indicates the performance of the CO or hydrocarbon oxidation catalyst in the oxidation of CO or hydrocarbon as determined by the temperature of the CO or hydrocarbon oxidation catalyst measured by the temperature measuring device.

21. A combination according to claim 1, wherein the exhaust apparatus further comprises at least one three-way catalyst, to convert CO in the exhaust gas to $CO_2$ by reaction with oxygen, hydrocarbon in the exhaust gas to $CO_2$ and water by reaction with oxygen, and nitrogen oxides in the exhaust gas to nitrogen, wherein said three-way catalyst is located upstream of said CO oxidation catalyst.

22. A combination of an internal combustion engine and an exhaust apparatus connected to said engine, wherein said exhaust apparatus comprises a CO oxidation catalyst to convert CO in an exhaust gas leaving the engine to $CO_2$ by reaction with oxygen, and a hydrocarbon oxidation catalyst to convert hydrocarbon in the exhaust gas leaving the engine to $CO_2$ and water by reaction with oxygen, by contacting the engine exhaust gas comprising CO, hydrogen and hydrocarbon with the CO oxidation catalyst and simultaneously or subsequently thereto contacting said exhaust gas with the hydrocarbon oxidation catalyst, wherein the CO oxidation catalyst is of light-off temperature for CO below ambient temperature under internal combustion engine exhaust operating conditions, and wherein control means are provided to control the engine so that on starting the engine at ambient temperature the exhaust gas produced by the engine, optionally, supplemented by secondary sources of oxygen, CO and/or hydrogen, and contacting the CO oxidation catalyst contains sufficient oxygen and sufficient CO so that an exothermic reaction of the oxygen with the CO on the CO oxidation catalyst generates enough heat to raise a temperature of the CO oxidation catalyst from ambient temperature to at least the light-off temperature of the hydrocarbon oxidation catalyst, whereby a temperature of the hydrocarbon oxidation catalyst is at least the light-off temperature of the hydrocarbon oxidation catalyst.

* * * * *